United States Patent
Alwan et al.

(10) Patent No.: US 7,224,908 B2
(45) Date of Patent: May 29, 2007

(54) ATTENUATION AND CALIBRATION SYSTEMS AND METHODS FOR USE WITH A LASER DETECTOR IN AN OPTICAL COMMUNICATION SYSTEM

(75) Inventors: James J. Alwan, Ramona, CA (US); Paul William Binun, Chula Vista, CA (US); Scott Harris Bloom, Encinitas, CA (US); Victor J. Chan, San Diego, CA (US); Glenn Claude Hoiseth, Temecula, CA (US); Hugh Michael O'Brien, IV, San Diego, CA (US); Scott Platenberg, Encinitas, CA (US); Werner Pyka, San Diego, CA (US); Raymond D. Rogers, San Diego, CA (US)

(73) Assignee: Kiribati Wireless Ventures, LLC, Las Vegas, NV (US)

( * ) Notice: Subject to any disclaimer, the term of this patent is extended or adjusted under 35 U.S.C. 154(b) by 747 days.

(21) Appl. No.: 10/045,661

(22) Filed: Oct. 23, 2001

(65) Prior Publication Data

US 2003/0066947 A1    Apr. 10, 2003

Related U.S. Application Data

(63) Continuation-in-part of application No. 09/941,319, filed on Aug. 28, 2001.

(60) Provisional application No. 60/240,346, filed on Oct. 13, 2000, provisional application No. 60/242,539, filed on Oct. 23, 2000.

(51) Int. Cl.
    *H04B 10/04*    (2006.01)
(52) U.S. Cl. ........................ 398/197; 398/120; 398/206

(58) Field of Classification Search ........ 398/120–123, 398/206–207, 197; 370/317–318; 455/501–506
See application file for complete search history.

(56) References Cited

U.S. PATENT DOCUMENTS

| | | | |
|---|---|---|---|
| 3,743,385 A | 7/1973 | Schaefer | 350/189 |
| 4,355,893 A | 10/1982 | Chicklis | 356/4 |
| 4,453,806 A | 6/1984 | Wick | 350/431 |
| 4,902,127 A | 2/1990 | Byer et al. | 356/5 |
| 5,060,304 A | 10/1991 | Solinsky | 359/152 |
| 5,181,211 A | 1/1993 | Burnham et al. | 372/21 |
| 5,383,200 A | 1/1995 | Barrett et al. | 372/25 |
| 5,451,765 A | 9/1995 | Gerber | 250/205 |
| 5,685,636 A | 11/1997 | German | 362/259 |
| 5,726,786 A | 3/1998 | Heflinger | 359/152 |
| 5,745,515 A | 4/1998 | Marta et al. | 372/45 |
| 5,777,768 A | 7/1998 | Korevaar | 359/172 |
| 5,837,996 A * | 11/1998 | Keydar | 250/221 |

(Continued)

*Primary Examiner*—Dzung Tran

(57) ABSTRACT

Systems and methods for use with an optical communication beam are disclosed. The system allows the beam of light to operate at an adequate power level that provides a robust optical link while minimizing any safety risk to humans. The system calibrates and controls the gain for an avalanche photodiode detector (APD). A detector circuit is used to calibrate the APD. Once calibrated, the detector circuit further provides an electrical bias to the APD to process or condition the electrical signal to produce a detector output. The systems and methods disclosed herein attenuate the power level of an incoming communication beam to prevent oversaturation of an APD. The system further provides an alignment signal, which is effective over a wide dynamic range of incoming power levels.

37 Claims, 22 Drawing Sheets

U.S. PATENT DOCUMENTS

| | | | |
|---|---|---|---|
| 6,014,236 A | 1/2000 | Flaherty | 359/118 |
| 6,031,219 A * | 2/2000 | Shuke | 250/214 R |
| 6,049,593 A | 4/2000 | Acampora | 379/56.2 |
| 6,055,490 A * | 4/2000 | Dunne | 702/159 |
| 6,222,660 B1 * | 4/2001 | Traa | 398/213 |
| 2003/0066947 A1 * | 4/2003 | Alwan et al. | 250/206 |

* cited by examiner

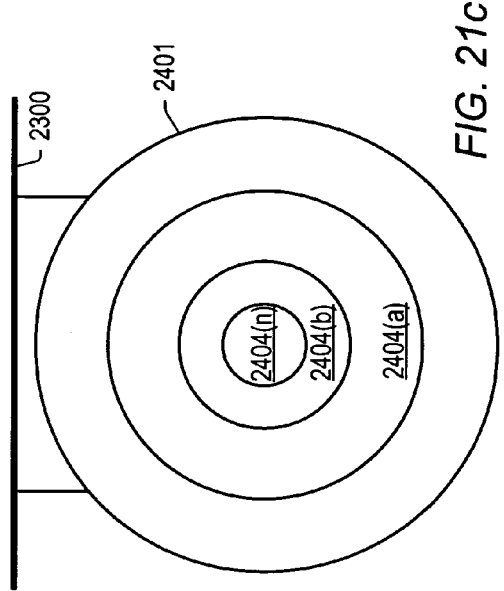
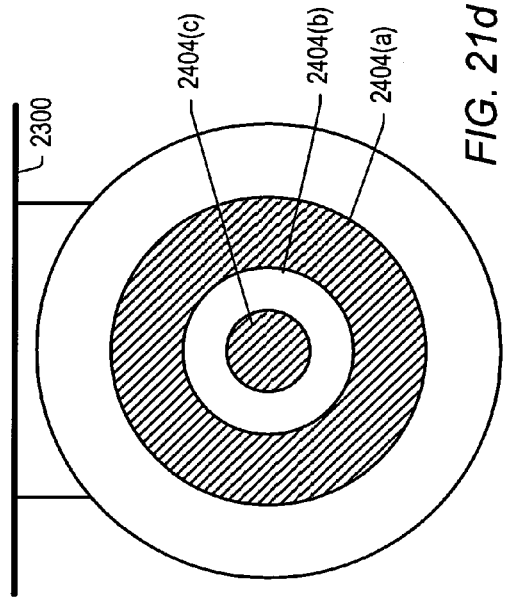
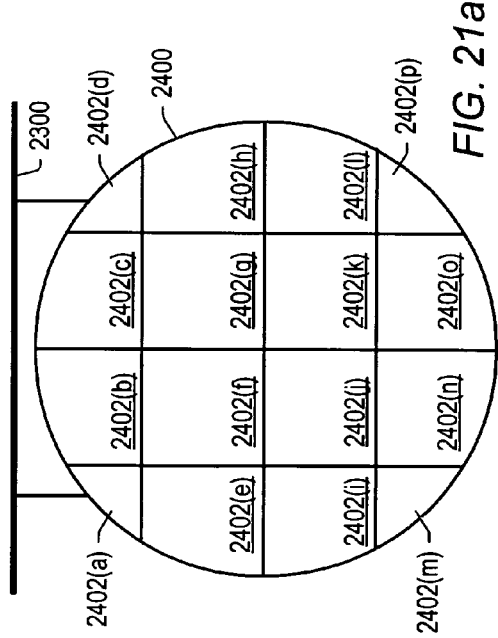
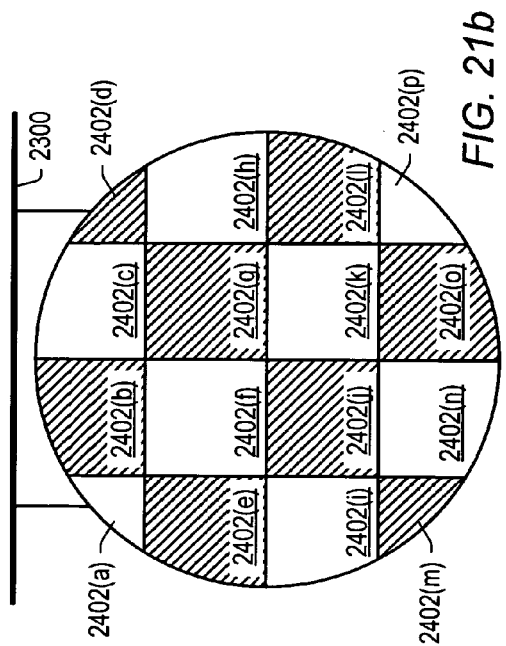

ATTENUATION AND CALIBRATION SYSTEMS AND METHODS FOR USE WITH A LASER DETECTOR IN AN OPTICAL COMMUNICATION SYSTEM

RELATED APPLICATIONS

This application is a continuation-in-part application of U.S. patent application Ser. No. 09/941,319, filed Aug. 28, 2001, titled "Automatic Laser Power Control in an Optical Communication System" which claims priority to a U.S. provisional patent application Ser. No. 60/240,346, filed Oct. 13, 2000, titled "Automatic Control of Laser Power in Free-Space Optical Links," both priority applications are hereby incorporated by reference. This application also claims priority to a U.S. provisional patent application Ser. No. 60/242,539, filed Oct. 23, 2000, titled "Optical Detector in a Free-Space Optical Communication Network," which is hereby incorporated by reference.

BACKGROUND OF THE INVENTION

1. Field of the Invention

The present invention relates to systems and methods for free-space optical communication networks and to a system and method for controlling the power of a laser used in such a network.

2. Description of the Related Art

Currently, the primary method for data transmission between remote locations utilizes wired lines or fiber optic cables. Some of the costs associated with this method are due to the expense in obtaining rights-of-way for the cable runs as well as installing the cables by burying or hanging. While this method has proven successful where great distances separate two locations, it is prohibitively expensive between locations that are within close proximity to one another.

The dramatic growth in the demand for broadband services and the time and expense associated with deploying traditional wired lines or fiber optic cables have led to the development of new wireless broadband access technologies. One of these new wireless technologies employs a Light Amplification Stimulated Emission of Radiation (laser) beam to transmit information. Such a system may consist of at least 2 optical transceivers accurately aligned to each other with a clear line-of-sight to deliver the information using such a laser beam.

However, when the communication laser beams are present in a location accessible by people, laser safety becomes an important issue. Unlike light produced by a common lamp or the sun, laser light is not divergent and often emits radiation within a narrow band of wavelengths to form a monochromatic light. Furthermore, because this laser light is coherent and non-divergent, it is easily focused by the lens of a human eye to produce images on the retina with greater intensity than is possible with these other common sources of light.

Safety guidelines do exist for the use of lasers. For example, such guidelines are promulgated by the International Electrotechnical Commission (IEC) based on a maximum permissible exposure (MPE) level. If one were to apply such a standard, a maximum power level could be predicted (known as an Accessible Emission Limit (AEL)) that would make the communication laser beam eye-safe to a viewer, known as a class 1 laser system in the IEC standard. However, to establish and maintain a high-bandwidth connection, the lasers used in such systems may transmit at power levels that exceed the class 1-power levels designated by these laser safety guidelines.

Therefore, there is a need for a system and a method that allows the use of optical communication beams of light with adequate power to provide a robust optical link between communication terminals while minimizing safety risks to either users or a passerby. Such a system and method may maintain a signal-to-noise ratio above a desired value at the distant receiving communication terminal and under various environmental conditions that tend to degrade the signal, such as fog, smog, rain, or snow. Moreover, such a system and method could expand the permissible locations for placement of such optical transceivers to places that are accessible to humans.

Optical-to-electronic conversion of a communication laser beam is an important process. In many optical communication systems, for example, an information-bearing optical wave, after transmission through an optical link, is received by an optical detector within the transceiver. The optical detector converts the optical wave into an electrical signal for further processing. The optical detector can include a photosensor and a detector circuit coupled thereto. The photosensor, such as a photodiode, converts the received photons of the optical wave into an electrical signal. This electrical signal is in the form of photo current or a photo voltage. For a given photosensor, the design and operation of its detector circuit can be configured to enhance the advantages and suppress disadvantages of the photosensor for a specific application. For example, the detector circuit can be used to calibrate the photosensor. Once calibrated, the detector circuit can further provide an electrical bias to the photosensor to process or condition the electrical signal to produce a detector output.

Laser transmitter and detector sensitivity dynamic ranges are often mismatched. Laser transmit power control typically have a more limited dynamic range that the laser detector. When optimal weather conditions occur between a laser transmitter and a detector, the laser transmitter can oversaturate the detector. Due to the limited dynamic range of the laser transmitter, the system may be unable to reduce the laser transmitter's power to prevent oversaturation. Additionally, incident light is reflected by the receiver and in a direction towards the transmitting laser. A receiver, which is associated with the transmitting laser, may experience interference with its incoming communication beam from this reflected light.

The quality of a received signal is often degraded when a detector is not aligned with the incoming communication beam. Alignment between a transmitter and a receiver is often performed using a signal transmitted between the transmitter and receiver. However, the signal's power may have a wide dynamic range which is difficult to process by the receiver.

Thus there is a need for system and method which calibrates a photosensor and enhances its operational dynamic range. The system should also attenuate the power level of an incoming communication beam to prevent oversaturation of a receiver. The system should further provide an alignment signal which is effective over a wide dynamic range of incoming power levels.

SUMMARY OF THE INVENTION

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description of the Preferred Embodiments" one will understand how the features of the system and methods provide several advantages over traditional communication systems.

One aspect is a system for calibrating an avalanche photodiode detector (APD) for use in an optical communication system which comprises a current sense module configured to measure a receive (Rx) power output value for an APD, a high voltage control (HVC) configured to provide a variable voltage bias to the APD in accordance with a high voltage control signal, and a thermal sensor configured to measure a temperature of the APD. The system further includes a processor configured to provide the high voltage control signal to the HVC, wherein the high voltage control signal is based on the temperature and the Rx power output value, and a high voltage supply configured to provide voltage to the HVC.

Another aspect is a method for calibrating an avalanche photodiode detector (APD) for use in an optical communication system which comprises turning off transmitted optical power incident on the APD to limit light from reaching the APD, lowering a bias voltage for the APD to zero volts, and once lowered, measuring an initial conduction for the APD. The method further includes storing the initial conduction, incrementally increasing the bias voltage until current is sensed through the APD, and once current is sensed, measuring a maximum bias voltage across the APD. The method still further includes determining a calibration value based on the initial conduction and the maximum bias voltage and applying the calibration value to the APD.

Another aspect is a system for increasing an operational dynamic range of an avalanche photodiode detector (APD) for use in an optical communication system comprising a current sense module configured to measure an incoming photo current to an APD, a high voltage control (HVC) configured to reduce a variable voltage bias to the APD in response to a decrease in the incoming photo current whereby an APD gain value is simultaneously decreased, a processor configured to control the variable voltage bias using a high voltage control signal based on the incoming photo current measured by the current sense module, and a high voltage supply configured to provide voltage to the HVC.

Another aspect is a method for increasing an operational dynamic range of a variable gain avalanche photodiode detector (APD) for use in an optical communication system comprising setting a voltage bias for an APD, sensing a reduction in incoming photo current to the APD, and reducing the voltage bias of the APD such that a gain value applied to the photo current is reduced, wherein an operational dynamic range of the APD is increased.

Another aspect is a method for controlling incoming laser power in a communication system which includes a first node and a second node where the second node transmits a first communication beam to the first node and where the first node includes a first optical attenuator. The method comprises monitoring the receive (Rx) power level of a photodiode detector in a first node, determining if the Rx power level exceeds a saturation threshold level for the photodiode detector, if the Rx power level exceeds the saturation threshold level of the photodiode detector, enabling a first optical attenuator that is located in a path between the first communication beam and the photodiode detector, and if the Rx power level is below a minimum threshold level of the photodiode detector, disabling the first optical attenuator.

Another aspect is a system configured for controlling incoming laser power in a communication system which includes a first node and a second node where the second node transmits a communication beam to the first node. The system comprises a first node having a photodiode detector configured to receive an incoming communication beam, a first optical attenuator coupled to the first node and configured to attenuate the incoming communication beam prior to it reaching the photodiode detector, a second node configured to transmit the incoming communication beam, and a first attenuation control module configured to control the first optical attenuator to maintain a power level of the incoming communication beam to within an operational range of the photodiode detector.

Another aspect is a system for aligning an optical receiver to an incoming communication beam for use in an optical communication system comprising an avalanche photodiode detector (APD) configured to convert a communication beam into a photo current, an amplifier configured to convert the photo current into a voltage signal, and a processing circuit configured to convert the voltage signal into a received signal strength indicator (RSSI). The system further comprises a current sense module configured to measure a receive (Rx) power signal for the APD, an actuator configured to align the APD with the communication beam, and a processor configured to control the actuator based on a combined power signal which includes the RSSI and the Rx power signal.

Another aspect is a method for aligning an optical receiver to an incoming communication beam for use in an optical communication system, wherein the optical communication system includes a first node and a second node, each including a movable avalanche photodiode detector (APD) configured to receive a communication beam from the other node. The method comprises converting an incoming communication beam to an APD into a photo current, converting the photo current into a voltage signal, and determining a received signal strength indicator (RSSI) from the voltage signal. The method further comprises determining a receive (Rx) power signal for the APD, and aligning the APD with the communication beam based on the RSSI and the Rx power signal.

BRIEF DESCRIPTION OF THE DRAWINGS

The present invention is described with reference to the accompanying drawings. In the drawings, like reference numbers indicate identical or functionally similar elements.

FIG. 21(*a*) is a plan view of the attenuating window from FIG. 20, further configured to incrementally attenuate a communication beam using sectors of the attenuating window.

FIG. 21(*b*) is a plan view of the attenuating window from FIG. 21(*a*) showing non-adjacent sectors in a colored state.

FIG. 21(*c*) is a plan view of the attenuating window from FIG. 20, further configured to incrementally attenuate a communication beam using areas between circles of the attenuating window.

FIG. 21(*d*) is a plan view of the attenuating window from FIG. 21(*c*) showing areas formed by circles 2404(*a*) and 2404(*b*) along with non-adjacent area formed by circle 2404(*c*), both in a colored state.

DETAILED DESCRIPTION OF THE PREFERRED EMBODIMENT

A free-space communication network may consist of at least two pairs of optical receivers and transmitters accurately aligned with each other with a clear line-of-sight to deliver high-bandwidth access over the air using beams of optical radiation, commonly called light. The light's wavelength is a function of a selected laser medium. Such laser mediums include, for example, solids, gases or liquids. The wavelengths form a continuous range but are often broken into specific regions, for example, infrared radiation (800 nanometer-10 microns), visible light (400 nm–700 nm), ultraviolet radiation (300 nm–3 nm), x-rays and gamma rays (<3 nm). In one embodiment, the optical receiver and transmitter are combined into an optical transceiver. Each optical transceiver can include at least one Light Amplification Stimulated Emission of Radiation (laser) and an optical detector. Embedded within the beams of radiation from the transmitter is information, for example, in the form of data, voice, and video. The corresponding receiver, which has an optical detector and associated signal processing circuit may convert the information into an electrical signal for further routing or processing.

Figure 1:
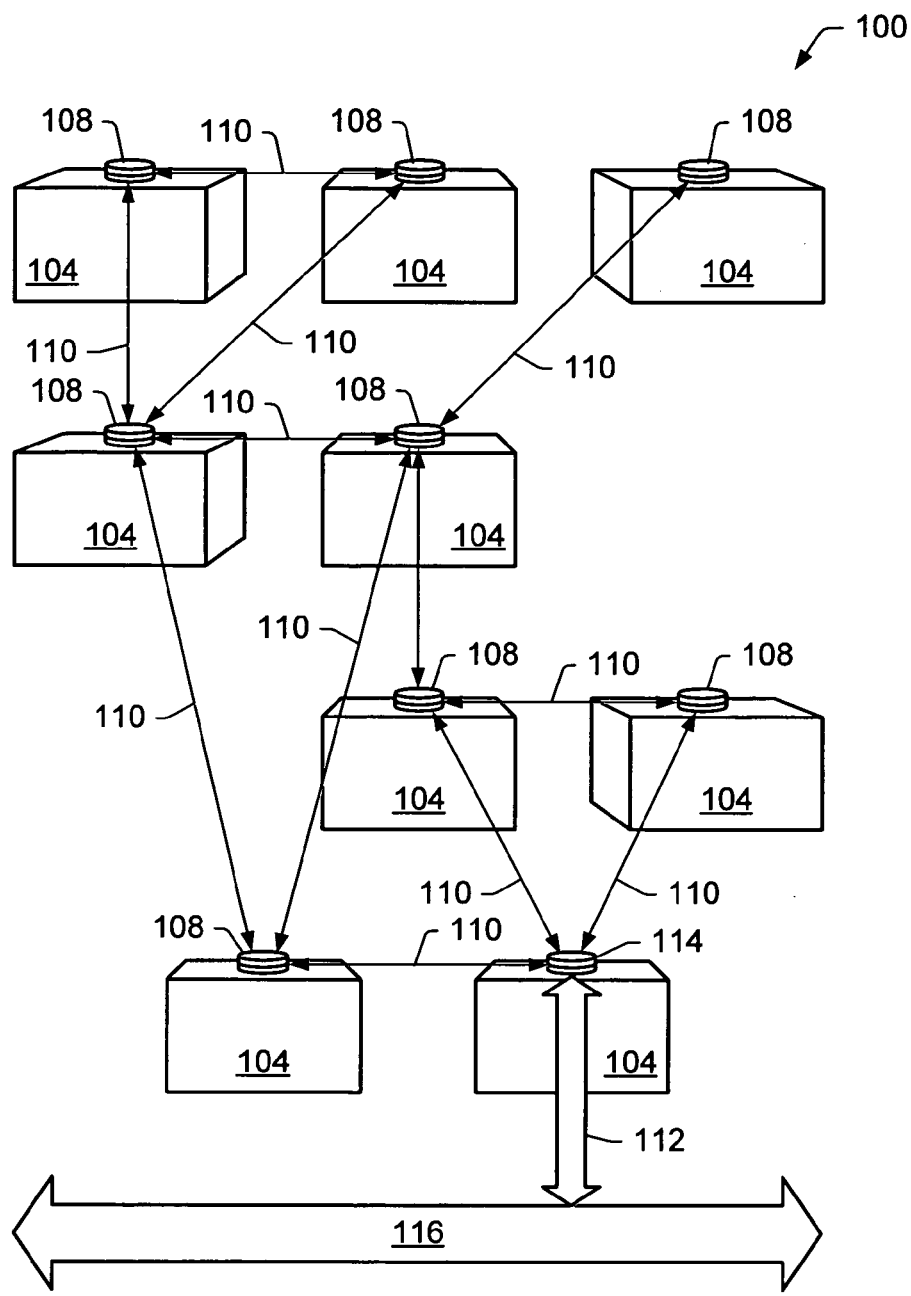
FIG. 1 is a diagram illustrating an example communication network.

FIG. 1 is a diagram illustrating an exemplary communication network 100. The communication network 100 includes a plurality of nodes 108, interconnected by communication links 110. Each communication link 110 includes two opposing beams of radiation between two nodes (i.e. incoming and outgoing beams). Certain of the communication links 110 may be radio links or microwave links under appropriate circumstances. According to one embodiment, the nodes 108 are disposed on facilities 104. Although only one node 108 is provided per facility in the example illustrated in FIG. 1, more than one node 108 can be provided at one or more of facilities 104, depending on the communication requirements, and also, perhaps, depending on the particular facility. Facilities 104 can be buildings, towers, or other structures, premises, or locations.

Nodes 108 are interconnected with one another by optical communication links 110. Nodes 108 include one or more optical transmitters and receivers to provide the communication links 110 among the plurality of nodes 108. The transmitters and receivers at nodes 108 can be implemented using, for example, lasers or light emitting diodes (LEDs) as the optical transmitters and charge-coupled devices (CCDs), photomultiplier tubes (PMTs), photodiode detectors (PDDs) or other photodetectors as the receivers. Although the network 100 illustrated in FIG. 1 is illustrated as a mesh network structure, other network structures or geometries can be implemented. For example, in one embodiment, branching tree architecture is used. In one embodiment, the nodes 108 include the capability to interface with up to four separate communication links 110.

Still referring to FIG. 1, network 100 provides a two-way connection between one or more users in one or more facilities 104 and with a provider network 116 via a root node 114. The root node 114 connects with the provider network 116 via another communication link 112. In one embodiment, the provider network 116 is a high bandwidth copper or fiber service provider. Although only one provider network 116 is illustrated in FIG. 1, one or more root nodes 114 can be used to interface to more than one provider network 116.

Figure 2:
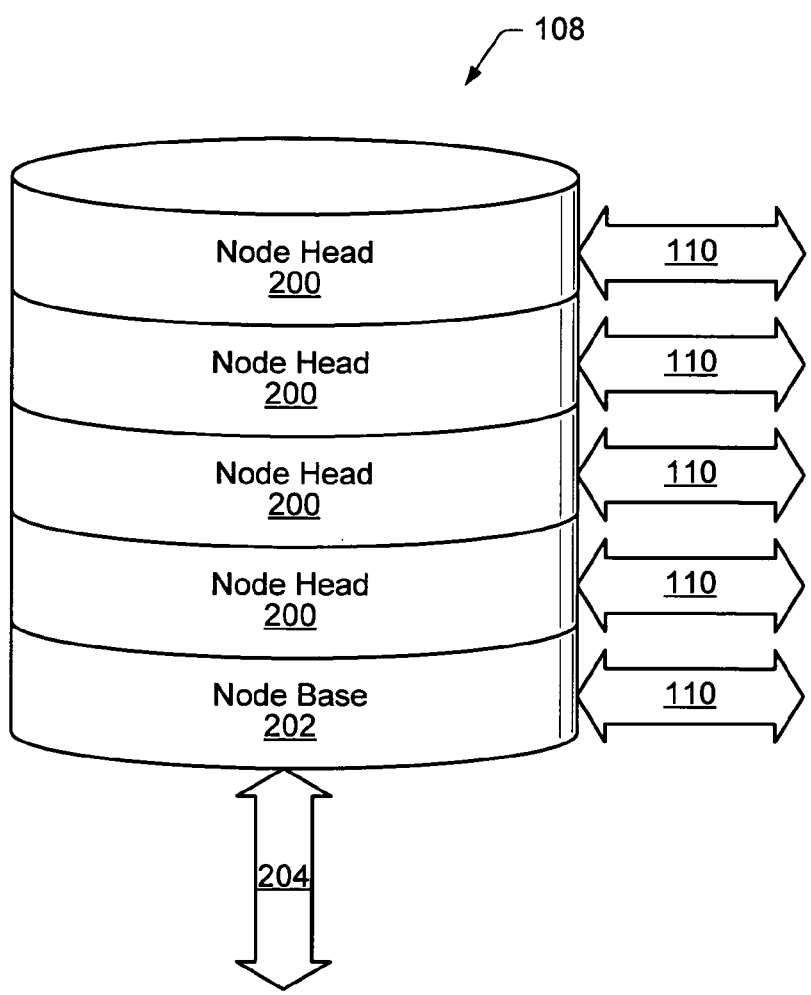
FIG. 2 is a diagram illustrating an example implementation of a node.

FIG. 2 is a diagram illustrating an example implementation of a node 108 which is generally cylindrical in shape and can include four node heads 200 and a node base 202.

Node heads 200 each include a transceiver (not shown) to facilitate communication with one or more other nodes 108 in a network 100 (see FIG. 1). Each node head 200 provides a two-way communication link 110 with one other node head in the network 100 at a given time. Thus, where each node head 200 has a single transceiver, node 108 communicates with up to four other nodes 108 at four separate locations. Alternatively, two node heads can provide parallel links to a single node. Other numbers of node heads 200 can be included, depending on the fan-out capability desired for the node 108. Node 108 further includes a drop 204 for connecting to a user. In one embodiment, the drop is hardwired between the node base 202 and into a facility 104 (see FIG. 1).

Node base 202 includes electronics and mechanics to provide a communication interface between, for example, a provider network 116 and the one or more node heads 200 via a communication link 112 (see FIG. 1). A communications interface to perform protocol or format conversions can be included in the node base 202 as well as mechanics to drive the pointing of one or more node heads 200.

One embodiment of the communication network 100 uses an optical transmission and multiplexing scheme for transferring data between the nodes 108 and the provider network 112. Such schemes use a physical layer technology to handle the actual transmission and reception of data. In one embodiment, synchronous optical network (SONET) is used which the American National Standards Institute standardizes. In another embodiment, synchronous digital hierarchy (SDH) is used which the International Telecommunications Union standardizes. The basic SONET channel transmits 52 Mbps or OC-1. Higher transfer rates are obtained with the use of multiplexing. For example, a transfer rate of 155 Mbps, or OC-3, is achieved where three OC-1 channels are byte-interleaved.

Figure 3:
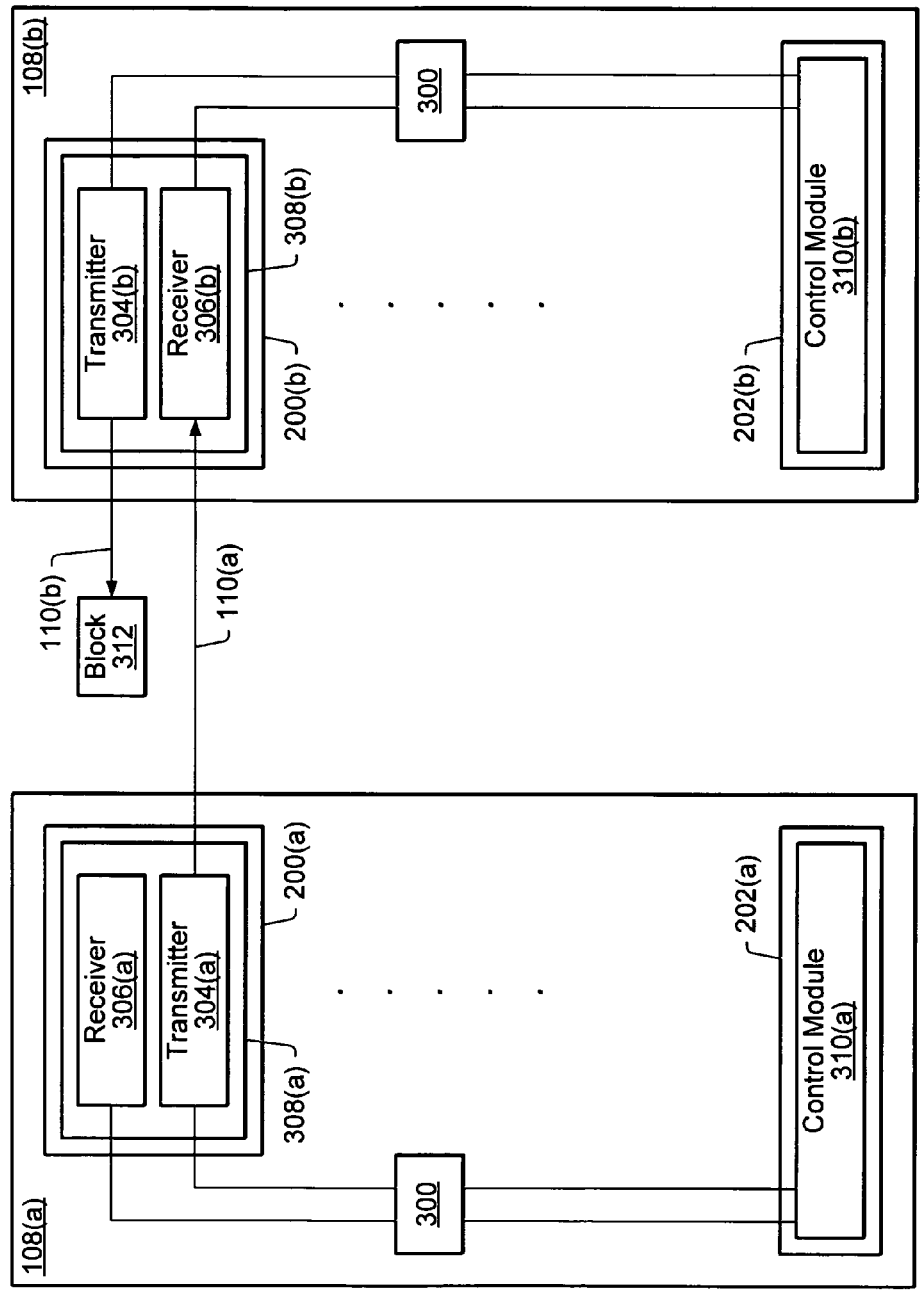
FIG. 3 is a block diagram illustrating a blocked communication link between two node heads of two nodes.

FIG. 3 is a block diagram illustrating a blocked communication link between two node heads 200(a), 200(b) of two nodes 108(a), 108(b). Node 108(a) includes a node base 202(a) coupled to at least one node head 200(a) via communication electronics 300. Node 108(b) includes a node base 202(b) coupled to at least one node 200(b) via communication electronics 300. Communication electronics 300 interface each node head 200(a), 200(b) to node base 202(a), 202(b). In one embodiment, the communication electronics 300 includes a bus which connects the node heads 200(a), 200(b) to their respective node bases 202(a), 200(b). In embodiments where each node 108(a), 108(b) includes multiple node heads, a multiplexer can be provided as part of the communication electronics 300 to allow communications among the various elements over a shared bus.

Each node head 200 can include a pointing mechanism such that it can be rotated to point to a designated other node 108. Such pointing can be performed in both azimuth and elevation. Ideally, each node head 200 can be independently pointed to a designated node 108.

Node head 200(a) includes a transmitter 304(a) and a receiver 306(a), thereby providing two-way communications. However, in alternate embodiments, the node head 200(a) has only the transmitter 304(a) or the receiver 306(a), thereby providing one-way communication. In another embodiment, the transmitter 304(a) and the receiver 306(a) are combined into a transceiver 308(a). Additionally, it is possible that node head 200(a) include more than one transceiver, or an additional receiver or transmitter to provide additional capabilities. Node head 200(b) includes a transmitter 304(b) and a receiver 306(b), thereby providing two-way communications. In one embodiment, the transmitter 304(b) and the receiver 306(b) are combined into a transceiver 308(b).

Node base 202(a) includes a control module 310(a). Similarly, node base 302(b) includes a control module 310(b). Each control module 310(a), 310(b) receives signals from the receiver 306(a), 306(b) and controls the operation of its respective transmitter 304(a), 304(b) based on the received signal. More specifically, the control module 310(a), 310(b) interrupts or reestablishes the transmission of the transmitter 304(a), 304(b), Thus, each control module 310(a), 310(b) controls its portion of the communication link with another node. The communication link is illustrated in FIG. 3 as including two communication beams 110(a), 110(b).

The term "module," as used herein, means, but is not limited to, a software hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

In operation, data that is transferred from node 108(a) to node 108(b) is modulated onto the communication beam 110(a) emitted by the transmitter 304(a). Receiver 306(b) processes the received modulated signal in the communication bean 110(a) such that it can be repeated or forwarded to another node 108 in the network 100. Alternatively, the processed signal can be passed either to an end user at a facility 104 or to a provider network 116 (see FIG. 1).

As mentioned above, the transmitter 304(b) can be interrupted due to an object 312 being present in the optical communication beam 110(b). The object may be any opaque matter that sufficiently attenuates the transmitted signal to a level such that the associated data is not detectable by the receiver 306(a). In one embodiment, the object reduces the power level of the communication beam 110(b) which is detected by the receiver 306(a). For example, a bird, a baseball, smog, fog, or an airplane could block the beam of radiation. In one embodiment, the lower bound signal-to-noise ratio that defines the block is selected based on the error rate associated with the received data. In another embodiment, the block is defined based on the duration of the interruption.

Figure 4:
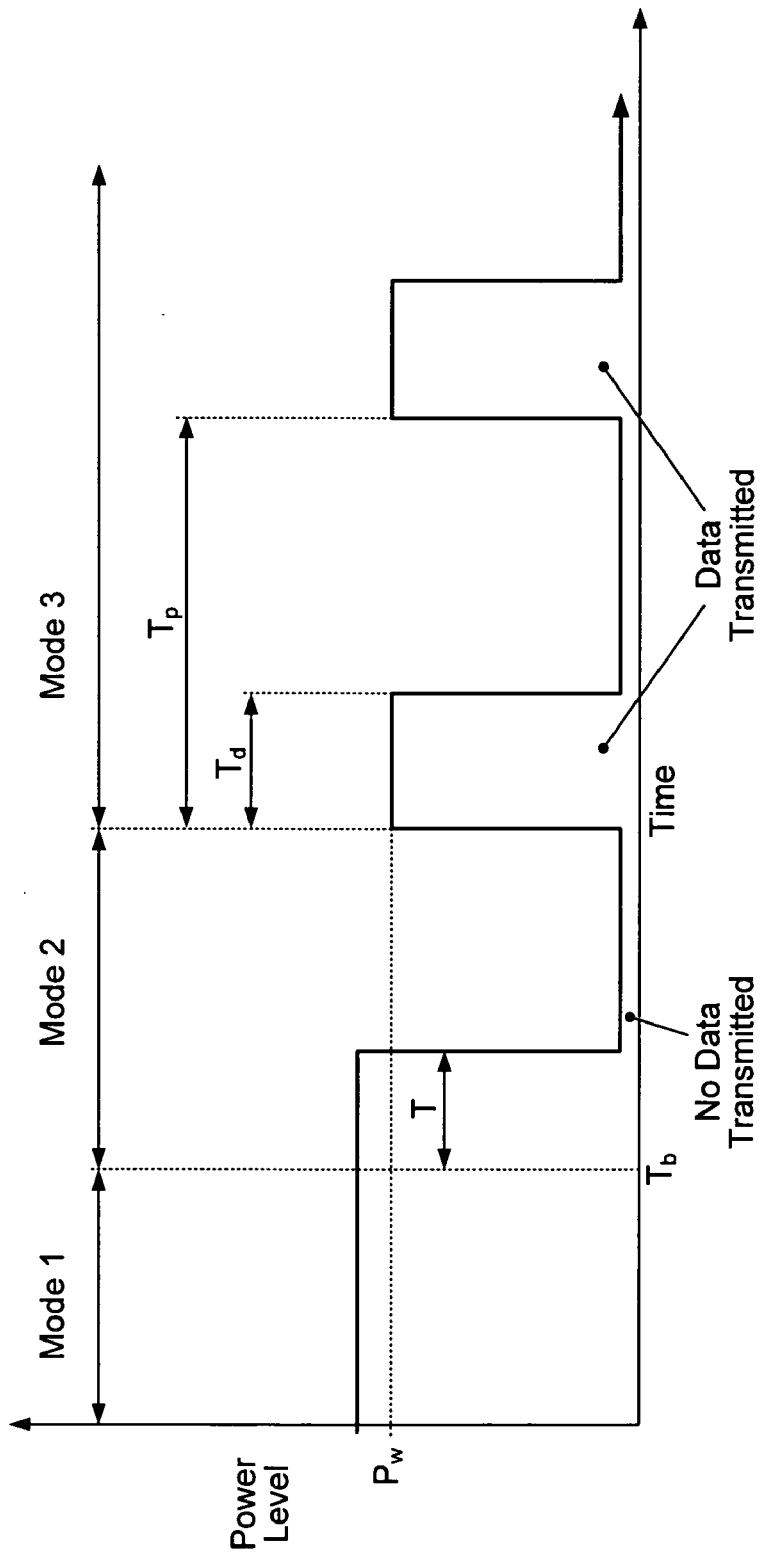
FIG. 4 is a graph of the power levels and associated durations of an interrupted beam of radiation.

FIG. 4 illustrates three different operating modes at different times that may be implemented by the control module 310(a), 310(b) depending on the status of the communication beams 110(a), 110(b). FIG. 4 depicts the average power of a communication beam over time. Referring to FIGS. 3 and 4, for example, when the communication beams 110(a), 110(b) are not blocked and are properly targeted, the control modules 310(a), 310(b) operate in a "normal operation" mode (Mode 1). In Mode 1, nodes 108(a), 108(b) modulate data on their respective communication beams 110(a), 110(b). The power levels of the communication beams 110(a), 110(*b*) are set to a high level to achieve desired signal-to-noise ratios at the respective receiver 306(*a*), 306(*b*), for example, 9.5 mW.

Assume, however, at a time $T_b$, the object 312 blocks one or both of the communication beams 110(*a*), 110(*b*) between the nodes 108(*a*), 108(*b*). For example, in FIG. 3, communication beam 110(*b*) is blocked by object 312. The power level of the communication beam 110(*b*) received by the receiver 306(*a*) suddenly drops. The control module 310(*a*) responds to this event by beginning the power reduction mode (Mode 2).

In the power reduction mode, the power level of the signal being transmitted by the transmitter 304(*a*) is immediately reduced to a low level or zero after a short period T of delay. In one embodiment, period T is 800 msec. The duration of T can be selected such that the total energy of the radiation transmitted by the transmitter 304(*a*) during period T is below a level that would present a safety hazard to humans. For example, if the transmitter 304(*a*) was transmitting at an initial power level of 9.5 mW during Mode 1, the maximum value of T is 0.85 seconds. The control module 310(*a*) stops sending data on communication beam 110(*a*). Instead, the data received by node 108(*a*) that would have been sent to node 108(*b*) can be re-routed to an alternate node 108 (not shown) via one of the other node heads.

In response to the drop in power by node 108(*a*), the control module 310(*b*) of node 108(*b*) can operate in a similar manner. Alternatively, the unblocked beam 110(*a*) can be left transmitting while a signal is sent, via a network management system (not shown), to alert node 108(*b*) that beam 110(*b*) is not being received. When the second beam is forced to fail, the control module 310(*b*) reduces the power of the communication beam 110(*b*) and stops sending data to node 108(*a*). Hence, blocking of a single communication beam 110(*b*) between two nodes 108(*a*), 108(*b*) results in an interruption and failure of the two-way communication. However, this response may have a delay since the node 108(*b*) is responding to the actions of node 108(*a*). By stopping the transmission of the unblocked beam 110(*a*), an immediate signal, in the form of a lack of signal, is sent to the node transmitting the blocked beam thus minimizing the complexity of notifying the blocked node and the associated delay in such notification. The value of T is selected to account for this delay so that the radiation transmitted by the transmitter 304(*b*) during T is also below a level that would present a safety hazard to humans.

Still referring to FIG. 4, once Mode 2 is executed and the output of the communication beam 110(*b*) is reduced to a safe level or shut off, the control module 310(*b*) begins an acquisition and recovery mode (Mode 3). Mode 3 will continue until the communication beam 110(*b*) is no longer blocked. As shown in FIG. 4, in one embodiment the control module 310(*b*) operates the transmitter 304(*b*) in a pulsed transmission mode by intermittently raising its power to a high level for a short pulse duration, $T_d$, with a time interval of $T_p$. The power level during each pulse duration, $T_d$, is sufficiently high so that the signal-to-noise ratio at receiver 306(*a*) is acceptable for the purpose of reestablishing optical communication. In one embodiment, the power level in each pulse is the same as the power level during the normal operation mode (Mode 1). In another embodiment, the pulsed power level is at a lower level. The communication beam 110(*b*) is modulated during each pulse duration, $T_d$, with acquisition data for establishing optical communication and is not modulated to carry data between pulses. The acquisition data may include, for example, a node ID, position, and orientation information. In another embodiment, the communication beam 110(*b*) sends out other data along with the acquisition data during the pulse duration. In still another embodiment, the control module 310(*b*) alternates between the acquisition data and other data between each pulse duration. The pulse duration $T_d$ and the period $T_p$ are selected so that the total radiation is below a level that would present an unacceptable hazard to humans. Thus, during mode 3, the object 312 is not exposed to a radiation level that would present a hazard to humans.

Figure 5:
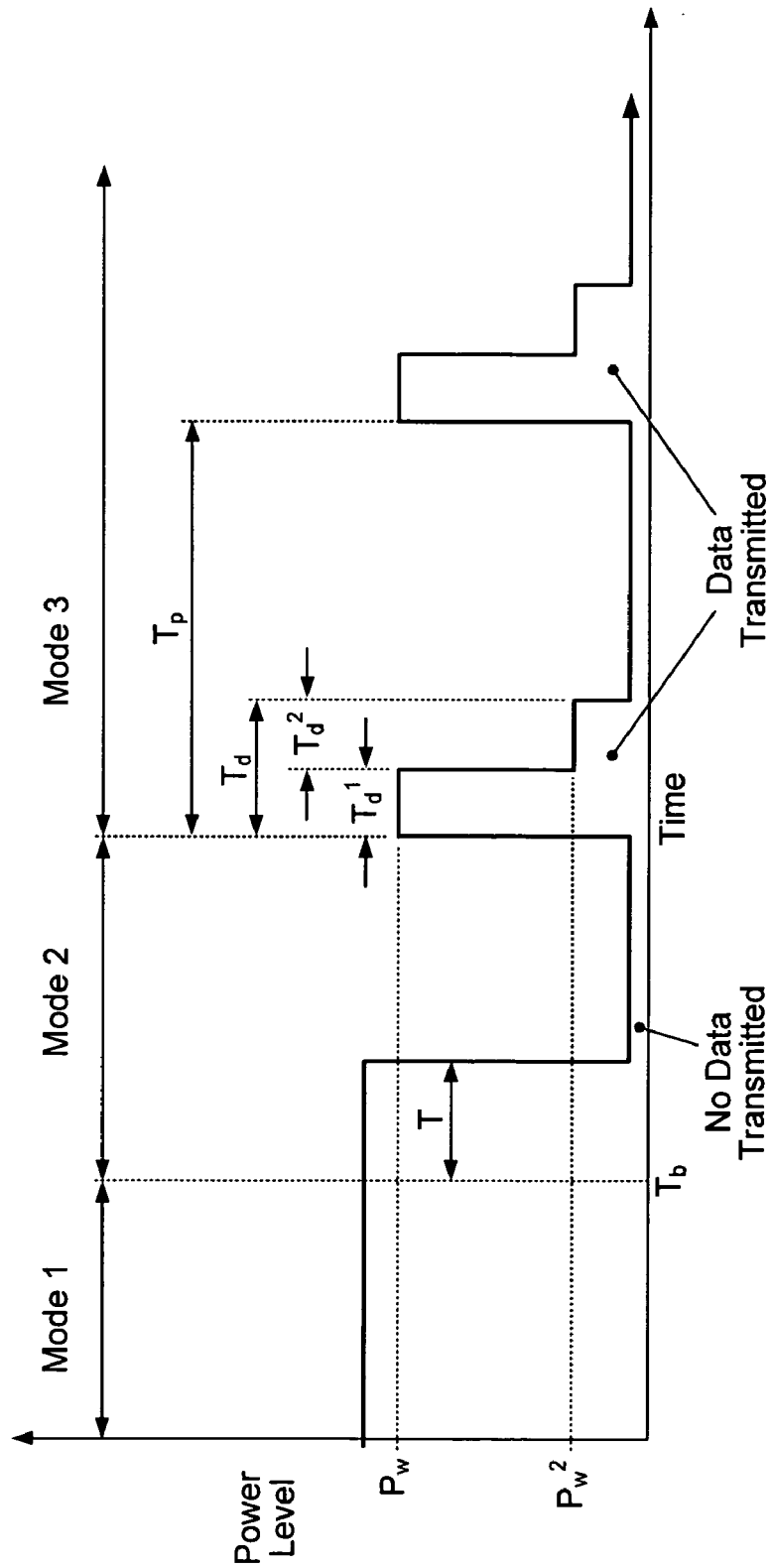
FIG. 5 is a graph of the power levels and associated durations of an interrupted beam of radiation.

FIG. 5 is a graph of the power levels of an interrupted communication beam over time. FIG. 5 depicts an embodiment where Mode 3 includes at least two different power levels, $T_d^1$ and $T_d^2$. Using different power levels can improve reestablishing optimal communication between nodes 108(*a*), 108(*b*) even during adverse weather conditions. For example, on a clear day when visibility is good and the communication beam 110(*b*) is not blocked, the transmitter 304(*b*) operates at a high power level, $T_d^1$. However, such a high power level may saturate receiver 306(*a*). To prevent this, the transmitter 304(*b*) transmits at a lower power level during $T_d^2$ so that the receiver 306(*a*) will properly detect the communication beam 110(*b*) and be able to extract the transmitted data. Conversely, the communication beam 110(*b*) transmitted at the low power level, $T_d^2$, may be too weak on a foggy day to achieve a desired signal-to-noise ratio at the receiver 306(*a*). By transmitting at the high power level during $T_d^1$, the receiver 306(*a*) will properly detect the communication beam 110(*b*) and be able to extract the transmitted data. Thus, this pulse structure allows two communicating nodes 108(*a*), 108(*b*) to reestablish optical communication at local environmental and weather conditions throughout the year.

Still referring to FIG. 5, in one embodiment, the pulse durations $T_d^1$ and $T_d^2$ are of equal duration and last for $T_d/2$. In another embodiment, both the high and low power levels, $T_d^1$ and $T_d^2$, are sufficiently high for communicating data to node 108(*a*). In still another embodiment, $T_d^1$ and $T_d^2$ are modulated to carry the same data. In this embodiment, the data on the first half of the pulse, $T_d^1$, is at one power level (e.g., the high level) while the same data is replicated on the second half of the pulse, $T_d^2$, at a different power level (e.g., the low level). This dual-level pulse technique may also be used to accommodate communication links within the network 100 architecture that have different node 108 distances. The pulse durations $T_d^1$ and $T_d^2$ and the period $T_p$ can be selected so that the total radiation exposure is below a level that would present an unacceptable hazard to humans.

The acquisition and recovery mode (Mode 3) is completed when both nodes 108(*a*), 108(*b*) reestablish optical communication. In one embodiment, node 108(*b*) sends a "ping" to node 108(*a*) and expects an "echo" back. If node 108(*a*) returns this "echo" through communication beam 110(*a*), node 108(*b*) knows it has made a connection and that both communication beams 310(*a*), 310(*b*) are not blocked. Alternatively, transmitter 304(*a*) sends a "ping" to receiver 306(*b*). If receiver 306(*b*) receives the "ping," control module 310(*b*) sends an "echo" through transmitter 304(*b*) back to node 108(*a*).

At this point, the control modules 310(*a*), 310(*b*) of each node 108(*a*), 108(*b*) terminate Mode 3 and begin the normal operating mode (Mode 1) as discussed above. As obvious to one skilled in the art, the control sequence is not limited by the order of the modes discussed above. For example, the modes disclosed could be repeated in various orders without disturbing the scope.

Figure 6:
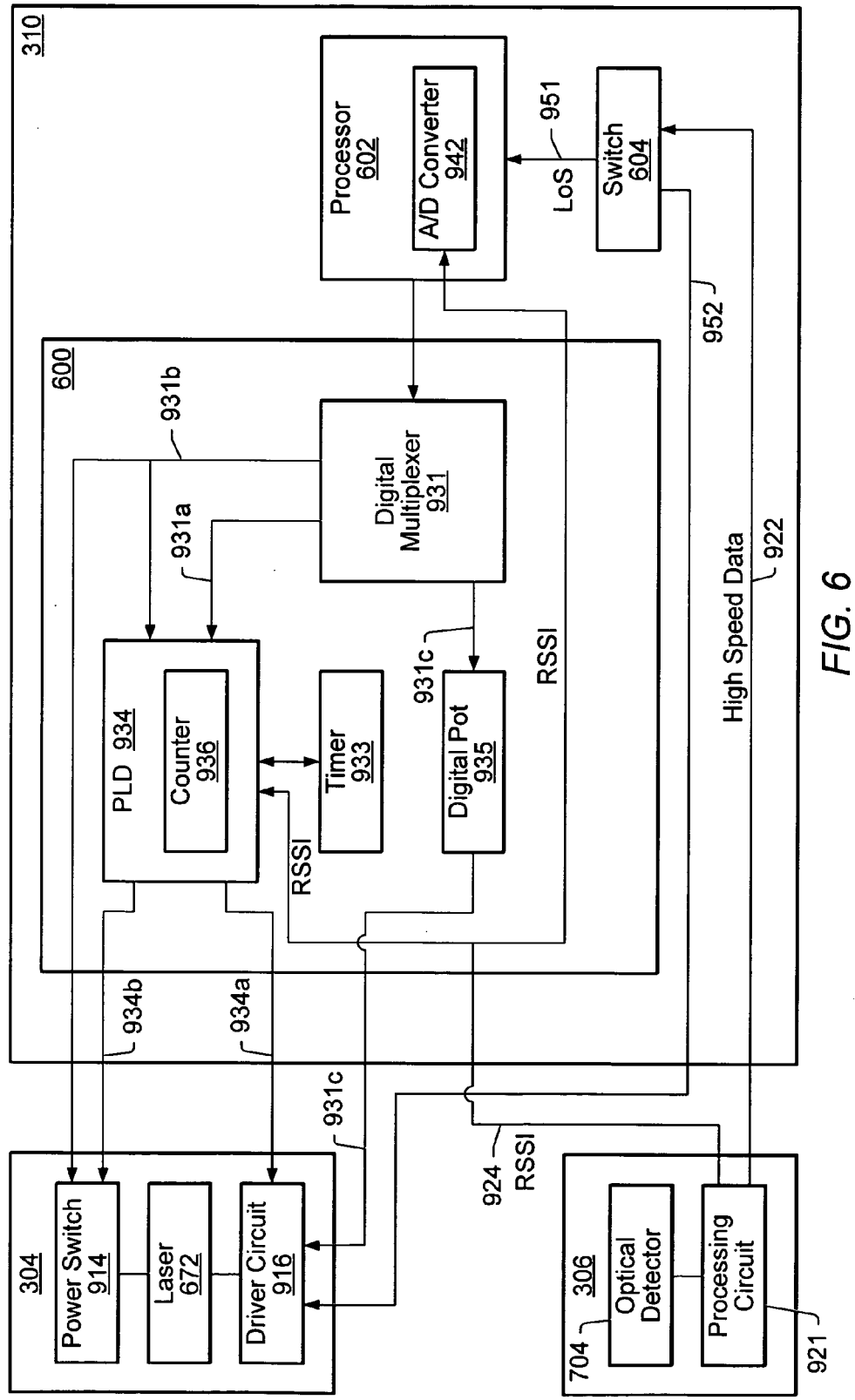
FIG. 6 is a block diagram of a control module from FIG. 3.

FIG. 6 is a block diagram of a control module 310(*a*) and/or 310(*b*) coupled to its associated transmitter 304 and receiver 306 from FIG. 3. The control module 310 includes a turret control module 600, a processor 602, and a switch 604.

The transmitter 304 includes a power supply switch 914, a driver circuit 916, and a laser 672. The power supply switch 914 drives power through laser 672. In one embodiment, the power switch 914 is a field effect transistor (FET). The driver circuit 916 controls the output power and data modulation of the laser 672 and can be independently controlled. Hence, in an event of blocking by an object, the output power of the laser 672 is independently controlled from the power switch 914 and/or the driver circuit 916.

The receiver 306 includes processing circuit elements 921 and an optical detector 704. The beam of a communication link that is transmitted by the laser 672 is focused onto the optical detector 704. In one embodiment, the optical detector 704 is a high-speed optical detector such as, for example, a PIN photodiode detector or avalanche photodiode detector (APD). The optical detector 704 is coupled to the processing circuit elements 921. The processing circuit elements 921 generate two different output signals 922 and 924 from the input signal received from the optical detector 704. The first signal 922 is the high-speed data extracted from the received beam of radiation and sent to the switch 604.

In one embodiment, the switch 604 is an ATM switch. ATM switches are generally well known in the art. Generally speaking, the ATM switch detects an arriving cell, aligns boundaries of cells arriving on multiple input lines, inspects the virtual path identifiers to determine the routing for a cell, converts the serial stream into a word parallel format, and time multiplexes the words onto time slots on a shared bus. A routing controller provides routing translation instructions to routing tables or accepts arriving virtual path identifiers from line interfaces to provide the correct routing instruction. A plurality of routing elements can be provided for each output. The routing element inspects the routing instruction associated with each word appearing on the shared bus, and delivers to its corresponding output cue only those cell segments intended for that output. In the ATM embodiment, each output cue reassembles the arriving word into ATM cells and delivers each ATM cell to the corresponding output port in serial format.

The second signal 924 is a received signal strength indicator (RSSI) which indicates whether an incoming beam of radiation is blocked by an object. The RSSI signal 924 is forwarded to the turret control module 600. In one embodiment, the RSSI signal 924 is in analog form.

One embodiment of the turret control module 600 includes a programmable logic device (PLD) 934, a digital multiplexer 931, a timer 933, and a digital pot 935. The PLD 934 provides local control intelligence for the turret control module 600 and includes a counter 936. The RSSI signal 924 sent by the receiver 306 is received by the PLD 934 and an analog to digital (A/D) converter 942. When the RSSI signal 924 indicates a blocking has occurred at time $T_b$ (see FIG. 4), the PLD 934 initiates Mode 2 operation after the delay time T to reduce or turn of the power to the laser 672 in the transmitter 304. The delay time T in Mode 1, as illustrated in FIG. 4, is controlled by a timing signal from the timer 933. Thus, once the RSSI signal 924 is lost, the counter 936 within the PLD 934 begins counting down the time. Once the counter 936 counts to the end of the delay T, a signal 934a is sent to turn off the laser 672 or reduce its power via the driver circuit 916. The resulting power level of the laser 672 is selected to limit the exposure of the object to the beam of radiation. In one embodiment, the PLD 934 generates a second signal 934b that is coupled to the power switch 914 to turn off the laser 672 or reduce its power, providing a single level of redundancy.

Still referring to FIG. 6, the processor 602 includes the A/D converter 942 which also receives the RSSI signal 924. The processor 602 runs or executes the modules described above and is programmed with software or firmware (not shown) to perform the power control sequence illustrated in FIG. 4. The turret control module 600 interfaces with and receives commands from the processor 602 via the digital multiplexer 931. In response to commands from the processor 602, the digital multiplexer 931 generates control signals 931a, 931b, 931c. Signal 931a is sent to the PLD 934 to reset the counter 936. The signal 931a is toggled periodically, for example, every 500 msec or less, to continually reset the counter 936 within the PLD 934. By continually resetting the counter 936, the PLD signal 934a is maintained at a value that keeps the laser 672 at a desired power level during the acquisition and recovery mode (Mode 3). During Modes 1 and 2, the signal 931a is not generated. In one embodiment, the signal 931a is left on during Modes 1 and 2 to allow continuous power to the laser 672.

The second control signal generated by the digital multiplexer 931 is signal 931b. Signal 931b controls both the PLD 934 and the power switch 914 in the transmitter 306. For example, if the processor 602 receives the RSSI signal 924, via the A/D converter 942, and determines that the beam of radiation is blocked by an object, signal 931b is set to a value that either turns off the power switch 914 or controls the power switch 914 so that the power of the laser 672 is reduced to a safe level. The signal 931b is also fed to the PLD 934 instructing the PLD 934 to set the value of the signal 934a to turn off or reduce the power of the laser 672 via the driver circuit 916. In another embodiment, the PLD 934 also sends signal 934b to control the power switch 914. Besides receiving the RSSI signal 924, the processor 602 is also notified that a block has occurred through a "loss of data" signal 951. The "loss of data" signal 951 is generated by the switch 604 when the high speed data signal 922 is lost.

The third control signal generated by the digital multiplexer 931 is signal 931c. Signal 931 c controls the digital pot 935. In response to signal 931c, the digital pot 935 controls the modulation power level of the driver circuit 916 of the transmitter 304.

Table A shows one example of the logic status of different signals in the control module 310 for the control sequence described above.

TABLE A

| Control Mode | Signal 931a | Signal 934a | Signal 931b | Signal 951 | RSSI Signal 924 | Laser 672 |
|---|---|---|---|---|---|---|
| Laser is commanded off | X | Low (Off) | Low | X | X | Off |
| Acquisition/ Recovery (Mode 3) | Running | High (On) | Mode 3 Waveform | X | X | On (Mode 3 Waveform) |
| Normal (Mode 1) | Off | High (On) | High | Low (Data) | High | On |
| Power | Off | Low | Low | High | Low | Off or at a safe |

TABLE A-continued

| Control Mode | Signal 931a | Signal 934a | Signal 931b | Signal 951 | RSSI Signal 924 | Laser 672 |
|---|---|---|---|---|---|---|
| Reduction (Mode 2) | | (Off) | | (no data) | | low power after delay T |

X = Do not care

METHOD OF OPERATION

Figure 7:
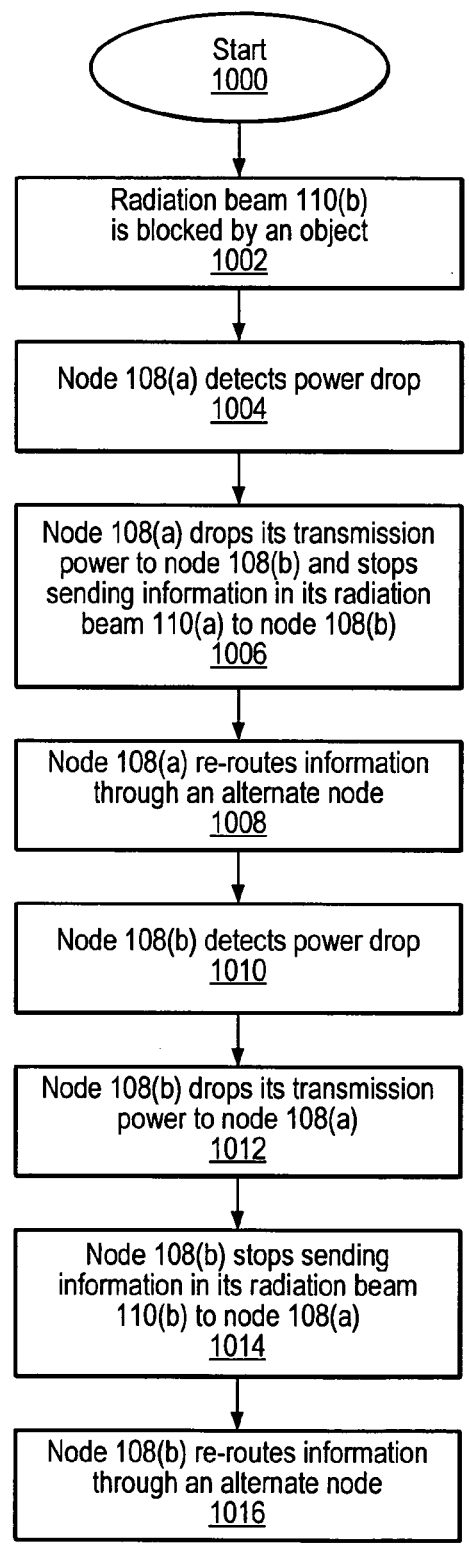
FIG. 7 is a flow chart illustrating a power reduction process performed by the control module.
Figure 8:
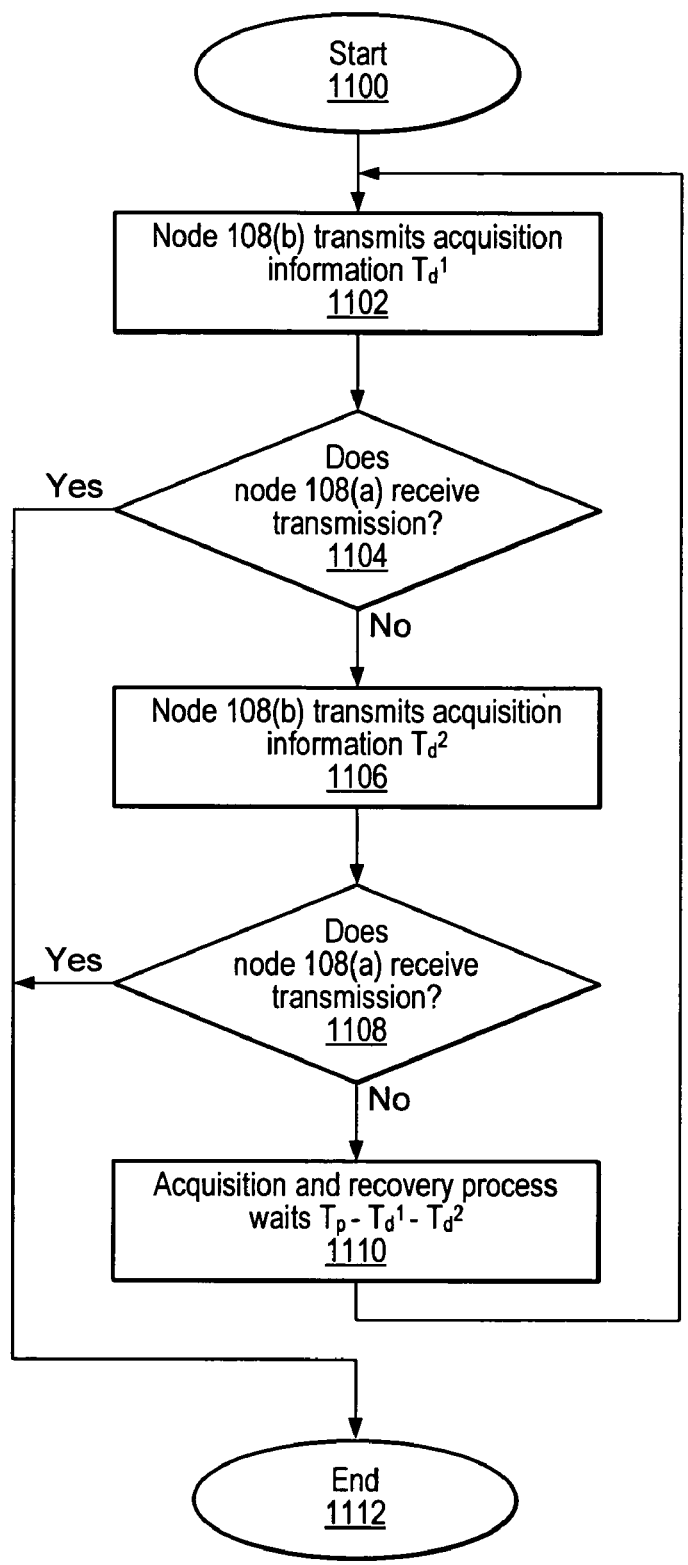
FIG. 8 is a flow chart of an acquisition and recovery process performed by the control module.

Operation of a communication network 100 in accordance with one embodiment is described below with reference to FIGS. 7 and 8 along with reference to FIG. 3. For convenience of description, the following text describes the communication network 100 where a single communication beam 110(b) has been blocked by an object 312. However, the following method can be used when both communication beams 110(a), 110(b) between nodes 108(a), 108(b) are blocked.

The process begins at a start state 1000. Next, at a state 1002, an object 312 blocks the communication beam 110(b). This may occur due to weather or an object, for example, a human or flying bird, entering the communication beam 110(b). Continuing to a state 1004, the control module 310(a), through receiver 306(a), detects a power drop in the communication beam 110(b) from a transmitter 304(b). Next, at a state 1006, in response to the drop in power, the control module 310(a) drops the power in a communication beam 110(a) sent by a transmitter 304(a) and stops sending data through transmitter 304(a) to node 108(b). Flow proceeds to state 1008 where the control module 310(a) re-routes the data that was earmarked for receiver 306(b) through an alternate node (not shown). Next, at a state 1010, the control module 310(b), through receiver 306(b), detects a power drop in the communication beam 110(a) from transmitter 304(a). Flow continues to a state 1012 where, in response to the drop in power, the control module 310(b) drops the transmission power of its communication beam 110(b) being sent by the transmitter 304(b) to node 108(a). Next, at a state 1014, the control module 310(b) stops sending data through transmitter 304(b) to receiver 302(a). Flow moves to state 1016 where the control module 310(b) re-routes the data that was earmarked for receiver 306(a) through an alternate node (not shown).

The acquisition and recovery process (Mode 3) performed by the free-space optical communication system 100 will now be described with reference to FIG. 8. For convenience of description, the following text describes a free-space optical communication system 100 where a single communication beam 110(b) is recovered. However, the acquisition and recovery process can also be used when both communication beams 110(a), 110(b) need to be recovered.

The free-space optical communication system 100 begins at a start state 1100. Next, at a state 1102, a control module 310(b) transmits the acquisition information during $T_d^1$ through transmitter 304(b). Flow proceeds to a decision state 1104 to determine if a receiver 306(a) of node 108(a) receives the transmission. In one embodiment, the control module 310(b) sends a "ping" through transmitter 304(b) along communication beam 110(b) and expects an "echo" back. If the "echo" is received by receiver 306(b) along communication beam 110(a), the control module 310(b) knows it has made a connection. The free-space optical communication system 100 then proceeds to an end state 1112 where the process terminates. Once Mode 3 terminates, Mode 1 is initiated. Referring again to decision state 1104, if the receiver 306(b) does not receive the "echo" transmission, the free-space optical communication system 100 continues to a state 1106 where transmitter 304(b) transmits the acquisition information during $T_d^2$. Flow moves to decision state 1108 to determine if the receiver receiving node received the information during $T_d^2$. If the receiving node receives the transmission, the free-space optical communication system 100 continues to the end state 1112. Referring again to decision state 1108, if receiver 304(a) does not receive the transmission, the free-space optical communication system 100 continues to a state 1110 where the acquisition and recovery process waits for the duration of $T_p-T_d^1-T_d^2$. Flow then proceeds to state 1102 as described above to repeat the transmissions.

Figure 9:
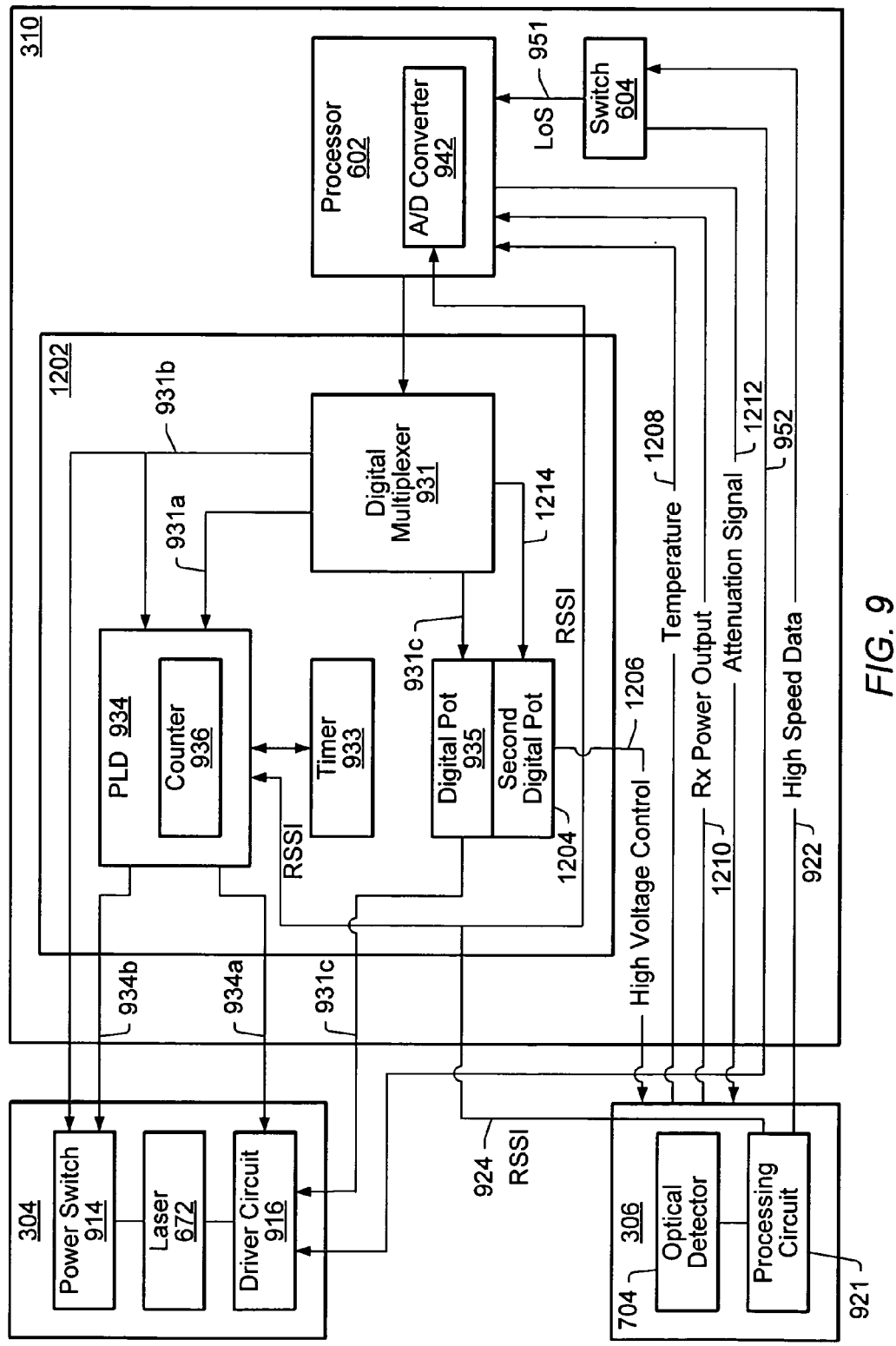
FIG. 9 is a block diagram of a control module from FIG. 3 configured to optimize the characteristics of an Avalanche Photodiode Detector (APD).

FIG. 9 is a block diagram of an embodiment of a control module 310 from FIG. 3 configured to optimize the characteristics of a receiver 306. The control module 310 depicted in FIG. 9 can be the control modules 310(a) and/or 310(b) shown in FIG. 3. In one embodiment, the receiver 306 can incorporate an Avalanche Photodiode Detector (APD) in its optical detector 704. In one embodiment, the APD operates at a rate at about 622 Mb/s or higher. The control module 310 is coupled to its associated transmitter 304 and receiver 306 from FIG. 3. The control module 310 includes a turret control module 1202, a processor 602, and a switch 604.

The processor 602 runs or executes the modules described herein and is programmed with software or firmware (not shown) to perform the optimization of the APD. The processor 602 is the same as previously described processor 602 (see FIG. 6) except for additional electrical connections with the receiver 306 to allow the processor to optimize the operation of the APD. These electrical connections provide the processor 602, via A/D converter 942, with a temperature signal 1208 and a receive (Rx) power output signal 1210. Both signals, and their uses, will be described below in detail.

The turret control module 1202 interfaces with and receives commands from the processor 602 via digital multiplexer 931. The turret control module 1202 is the same as previously described turret control module 600 (see FIG. 6) except for the addition of a second digital potentiometer (pot) 1204. The second digital pot 1204 is electrically connected in parallel with previously described digital pot 935 (see FIG. 6). In response to commands from the processor 602, the digital multiplexer 931 generates control signal 1214. Control signal 1214 controls the digital pot 1204. In response to signal 1214, the digital pot 1204 controls the modulation power level of the optical detector 704, i.e. APD, via high voltage control signal 1206.

The processor 602, via the A/D converter 942, further provides an attenuation signal 1212 to the receiver 306. The receiver 306 uses the attenuation signal 1212 to activate an optical attenuator (not shown). The optical attenuator will be described in detail below with reference to FIG. 15. The transmitter 304 and switch 604 are the same as described above with reference to FIG. 6.

Figure 10:
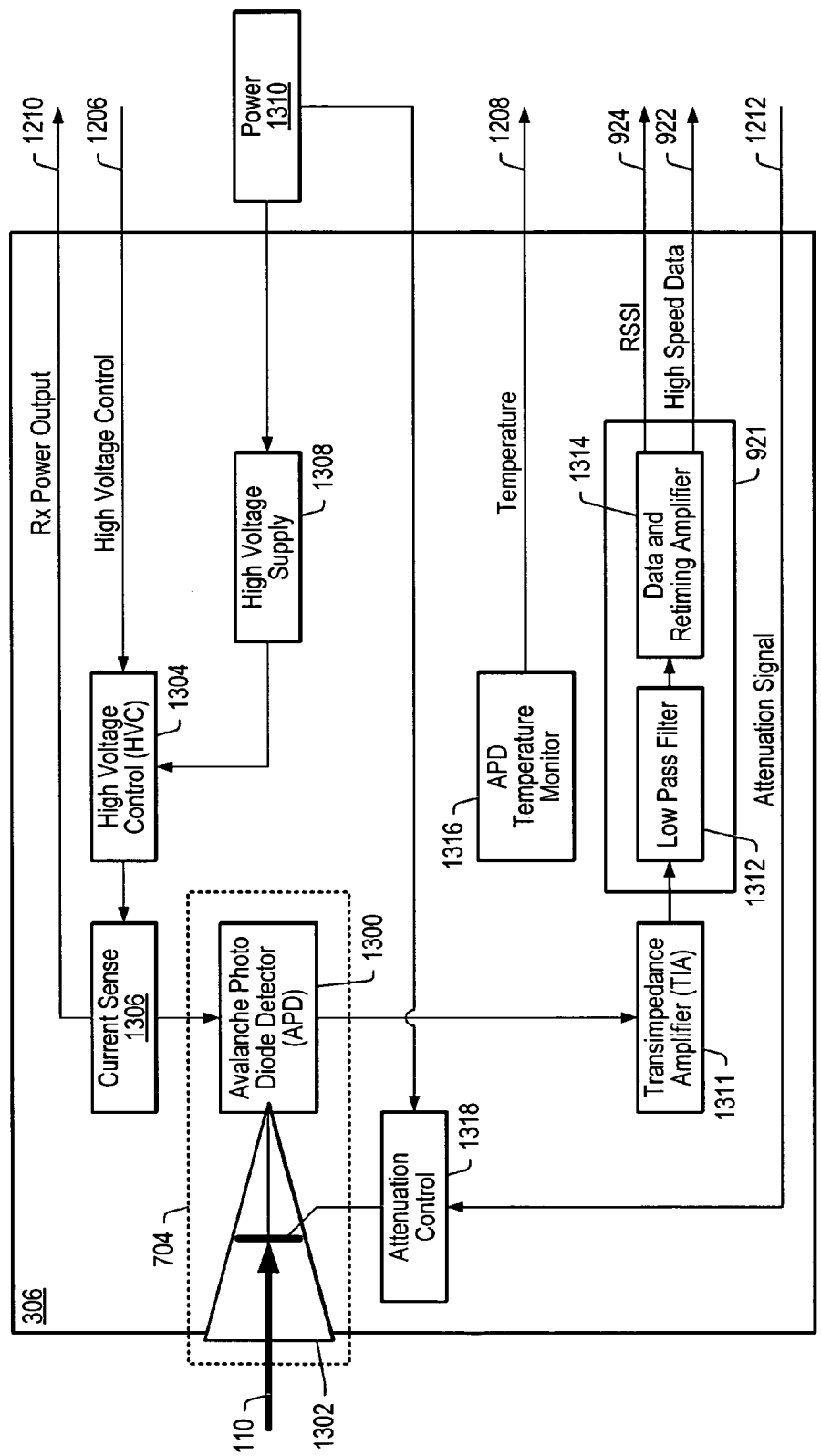
FIG. 10 is a block diagram of a receiver from FIG. 9 showing the APD and the components related thereto.

FIG. 10 is a block diagram of a receiver 306 from FIG. 9 implemented with an APD type optical detector 1300 and showing the components related thereto. The optical receiver 306 is configured to receive an on-off keyed (OOK) data modulated optical signal. The receiver 306 is further configured to convert the signal into a voltage level, and to amplify and retime the data with phase locked loop clock recovery. The operation of this example receiver circuit is now described. After reading this description, it will become apparent to one of ordinary skill in the art how receiver 306 can be implemented with other receiver detectors, architectures or configurations, or to receive signals modulated at wavelengths other than optical wavelengths.

In the embodiment illustrated in FIG. 10, light from a communication link, for example, 110(a) or 110(b) of FIG. 3, is focused onto an optical detector 704. The optical detector 704 is a high-speed optical detector, such as, for example, an avalanche photodiode detector (APD) 1300, to detect the total amount of power transmitted by a transmitter. The APD 1300 can include, for example, a 50-mm aperture 1302. Other detectors can be utilized to detect energy at optical or other wavelengths depending on the application. Receiver 306 also includes components that provide control and temperature compensation of a high voltage bias that is supplied to the APD 1300 for its operation.

A bias voltage is applied to the APD through series resistances located in a high voltage control (HVC) module 1304 and a current sense module 1306. A power module 1310 provides power to a fixed high-voltage power supply 1308. The fixed high-voltage power supply 1308 is further coupled to the HVC module 1304. The voltage operating range for the APD is determined during a calibration process which will be described below with reference to FIG. 12. During APD operation, the current sense module 1306 senses the bias voltage across the APD. The current sense module 1306 then amplifies the current that corresponds to the sensed voltage. The output of the current sense module 1306 is then provided to the processor 602 (see FIG. 9). This output is Rx power output signal 1210 and functions as a power indication signal for the processor 602.

When light from the communication beam 110 is focused onto the active area of the APD 1300, the APD 1300 generates a photo current proportional to the intensity of the light. An amplifier 1311 converts the generated photo current to a voltage signal. In one embodiment, the amplifier is implemented as a high-speed transimpedance amplifier (TIA), which converts the photo current to a differential voltage signal. An example implementation of a high-speed TIA is the Maxim MAX3664transimpedance amplifier, available from Maxim Integrated Products, Inc of Sunnyvale, Calif.

The voltage signal continues to a processing circuit 921. The processing circuit includes a low pass filter 1312 configured to filter the voltage signal to reduce high frequency noise prior to further amplification. In one embodiment, low pass filter 1312 is a third order, 500 MHz, low pass filter, although other filters or band-pass frequencies can be used. The processing circuit 921 further includes a data and retiming amplifier 1314. The data and retiming amplifier 1314 provides further amplification of the voltage signal and re-times the data to a phase locked loop internal clock. In one embodiment, the data and re-timing amplifier 1314 is implemented using a Maxim MAX3675 device providing AC coupled differential emitter-coupled logic (ECL) outputs, re-timed to a phase-locked loop internal clock at a nominal data rate of 622 Mbit/second. Other amplifiers can be implemented and can include alternative output levels and operate at alternative clock and data rates.

The output of the data and re-timing amplifier 1314 provides a received signal strength indicator (RSSI) 924 and a high speed data signal 922. The RSSI signal 924 is sent to a programmable logic device (PLD) 934 (see FIG. 9) and A/D converter 942 (see FIG. 9) for diagnostic purposes. The RSSI can be used to determine if the received signal is within the dynamic range of the receiver, whether the effective transmit power should be adjusted, or for optical alignment purposes. The high-speed data signal 922 is provided to high data rate switch 604 (see FIG. 9).

Receiver 306 further includes an APD temperature monitor 1316. The APD temperature monitor 1316 generates a signal in the form of temperature signal 1208 indicating the temperature of the APD 1300. This is useful where the operation of the receiver is highly temperature dependent. For example, the operating voltage of an exemplary APD 1300 changes at a rate of 0.4 volts/° C. Temperature signal 1208 is used for diagnostic purposes. As illustrated in FIGS. 9 and 10, the RSSI signal 924, Rx power output 1210, and temperature signal 1208 are all provided to the processor 602 for diagnostic and control purposes.

The present techniques and devices include a detector circuit that automatically measures properties of the APD 1300 and accordingly adjusts the electrical bias to the APD 1300 to improve its performance. Hence, different APDs coupled to such detector circuits may be biased differently due to variations in the characteristics of the APD 1300. These techniques and devices allow each APD 1300 to be optimized individually with respect to the characteristics of that particular APD 1300.

Figure 11:
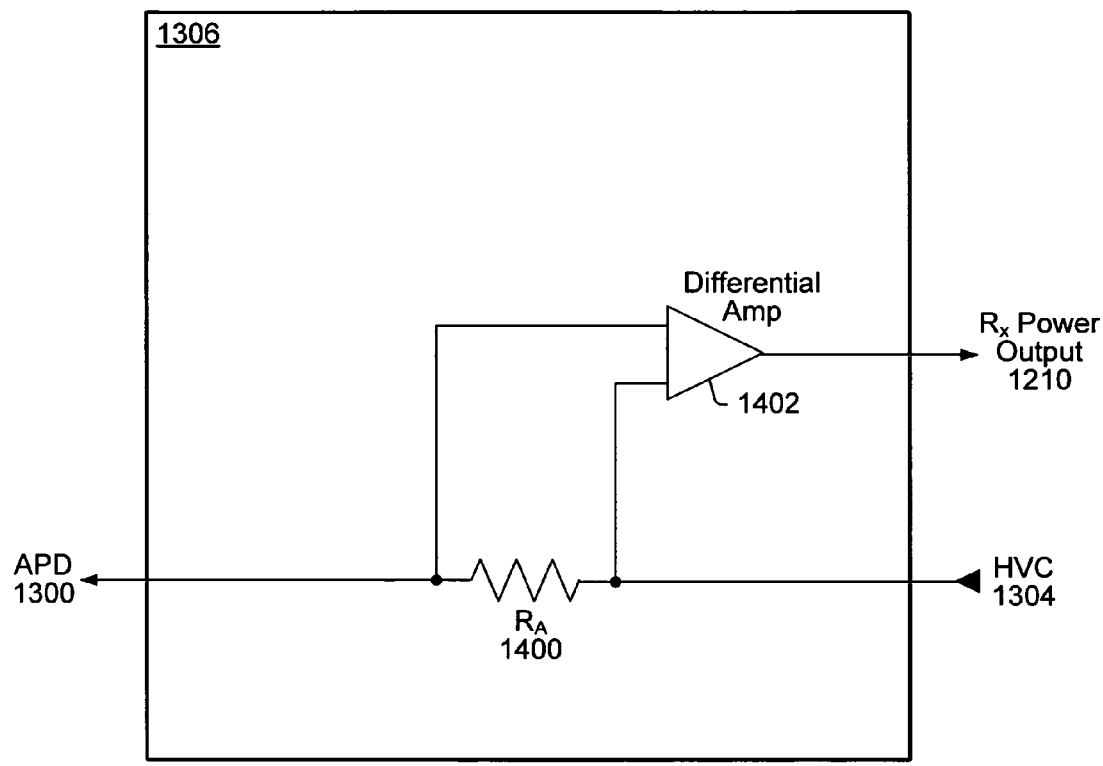
FIG. 11 is a schematic diagram of a current sense module from FIG. 10 for use during a calibration process.

FIG. 11 is a schematic diagram of a current sense module from FIG. 10 for use during a calibration process of the APD. Properties of the APD that are measured during the calibration process may include, for example, the maximum breakdown voltage, and the variation performance due to changes in temperature of the APD. To this end, the current sense module 1306 is configured to obtain conduction measurements of the APD 1300 during a calibration phase. The conduction measurements can be in the form of a current or voltage. These measurements, along with temperature signal 1208, are used by the processor 602 (see FIG. 9) to determine a calibration value for the APD 1300. The current sense module includes a resistor $R_A$ 1400 and a differential amplifier 1402. The resistor $R_A$ 1400 is configured to measure the conduction across the APD during the calibration process. During this calibration process, the voltage received from the HVC module 1304 is incrementally increased until conduction through the APD is measured by resistor $R_A$ 1400. The differential amplifier 1402 then amplifies the measured conduction. The output of the differential amplifier 1402 is provided to the processor 602 in the form of the Rx power output signal 1210. The processor 602 uses the Rx power output signal to control the HVC module 1304 via the turret control module 1202.

Figure 12:
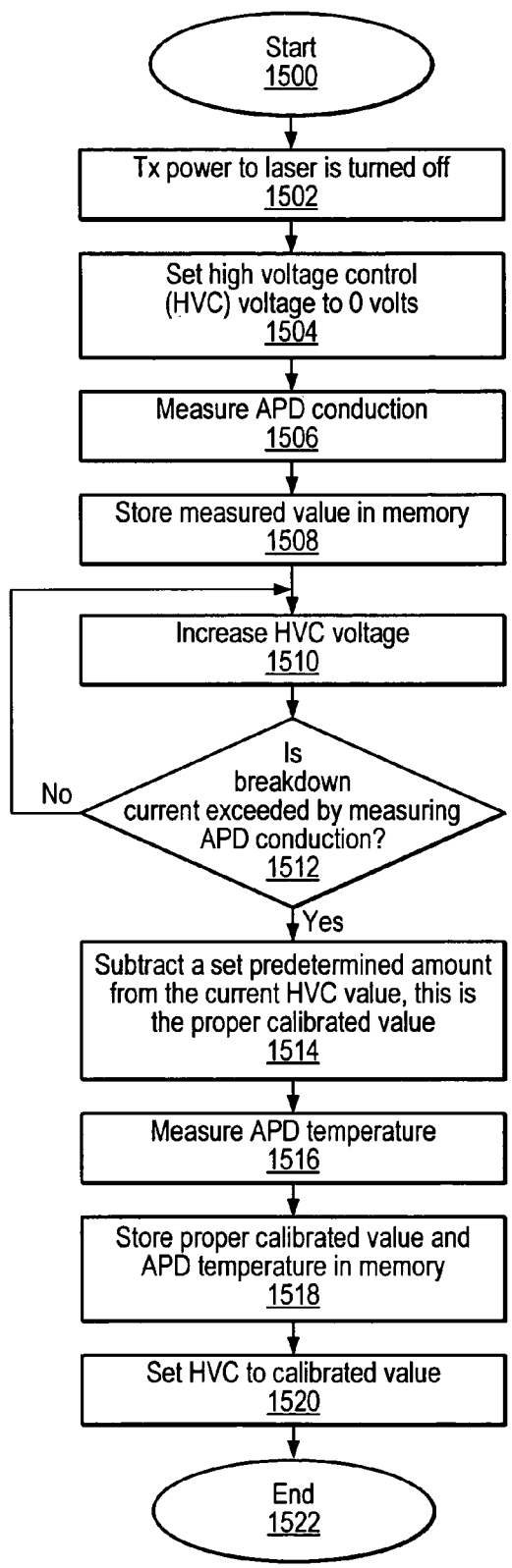
FIG. 12 is a flow chart illustrating a calibration process for the APD that is performed by the control module.

FIG. 12 is a flow chart illustrating a calibration process for the APD that is performed by the control module. The current sense module 1306 senses the conduction, i.e. electric current, to the APD 1300 and produces a feedback signal; i.e. Rx power output 1210, to adjust the actual bias to the APD 1300. Such adjustment is performed in the calibration stage in which the breakdown bias voltage of a particular APD 1300 is measured first and then the proper bias voltage for operating that APD is set by reducing the breakdown bias by a desired amount.

The calibration process begins at a start state 1500. Next, at a state 1502, the transmit power to laser 672 (see FIG. 9) is turned off. This prevents any reflected light from reaching the APD 1300. Flow continues to state 1504 where the HVC voltage is set to zero volts. Next, at a state 1506, the conduction of the APD is measured by the current sense module 1306 and is provided to the processor 602 via Rx power signal 1210. Flow proceeds to a state 1508 where the processor 602 stores the measured value in a memory (not shown). Next, at a state 1510, the processor 602 instructs the HVC module 1304 to incrementally increase the voltage to the APD. More specifically, the processor 602 sends commands to the digital multiplexer 931. In response to the commands from the processor 602, the digital multiplexer 931 generates control signal 1214. Control signal 1214 controls the digital pot 1204. In response to signal 1214, the digital pot 1204 controls the modulation output power level of the optical detector 704, i.e. APD, via high voltage control signal 1206. Flow proceeds to a decision state 1512 to determine if the breakdown current of the APD is exceeded. The breakdown current corresponds to the maximum bias operating range for the APD 1300. This breakdown current is determined by having the current sense module 1306 re-measure the APD conduction. If the current sense module 1306 does not measure conduction through the APD, flow returns to state 1510 where the processor 602 instructs the HVC module 1304 to incrementally increase the voltage to the APD. Flow then continues to decision state 1512 where the conduction through the APD is re-measured.

If the breakdown current of the APD is exceeded at decision state 1512, flow proceeds to state 1514 where the processor 602 subtracts a set predetermined amount from the current value of the HVC module 1304. Next, at a state 1516, APD temperature module 1316 measures the temperature of the APD 1300. This value is provided to the processor 602 via temperature signal 1208. Flow proceeds to state 1518 where the processor 602 stores the proper calibrated value determined at state 1514 and the temperature value measured at state 1516 in memory (not shown). Flow continues to a state 1520 where the processor 602, via the turret control board, sets the HVC module 1304 to the calibrated value. This calibrated value is the maximum voltage bias of the APD. Signal drift due to the thermal effects can also be corrected by the feedback to the HVC module 1304. The calibration process then proceeds to an end state 1522 where the process terminates.

Figure 13:
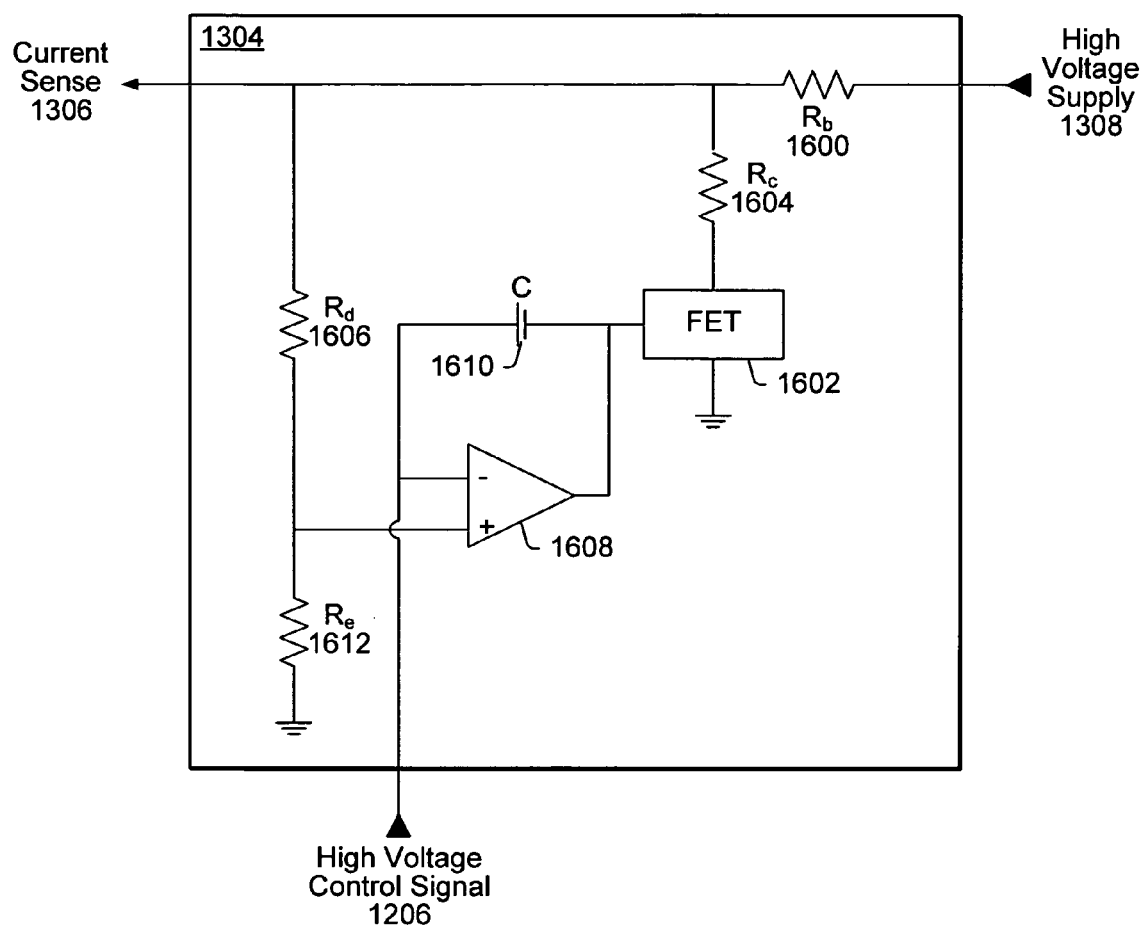
FIG. 13 is a schematic diagram of a high voltage control (HVC) module from FIG. 10 which operates in conjunction with a resistor from the current sense module to enhance the operational dynamic range of the APD.

FIG. 13 is a schematic diagram of a high voltage control (HVC) module 1304 from FIG. 10 which operates in conjunction with a resistor from the current sense module to enhance the operational dynamic range of the APD. The HVC module 1304 includes a resistor $R_B$ 1600 located in series between high-voltage supply 1308 and current sense module 1306. In one embodiment, the resistor $R_B$ 1600 has a resistance of 100 K ohms. The HVC module 1304 further includes a feedback circuit for biasing the output voltage to the current sense module 1306. In one embodiment, the feedback circuit includes a field effect transistor (FET) 1602 located in series with a resistor $R_C$ 1604, a resistor $R_D$ 1606, and a differential amplifier 1608. In one embodiment, resistor $R_C$ has a resistance of 182 K ohms and resistor $R_D$ has a resistance of 10.2 M ohms. The differential amplifier 1608 receives high voltage control signal 1206 from processor 602 via turret control board 1202. The feedback circuit further includes capacitor 1610 and resistor $R_E$ 1612. In one embodiment, capacitor 1610 has a value of 390 pF and resistor $R_E$ has a resistance of 100 k ohms.

Figure 14:
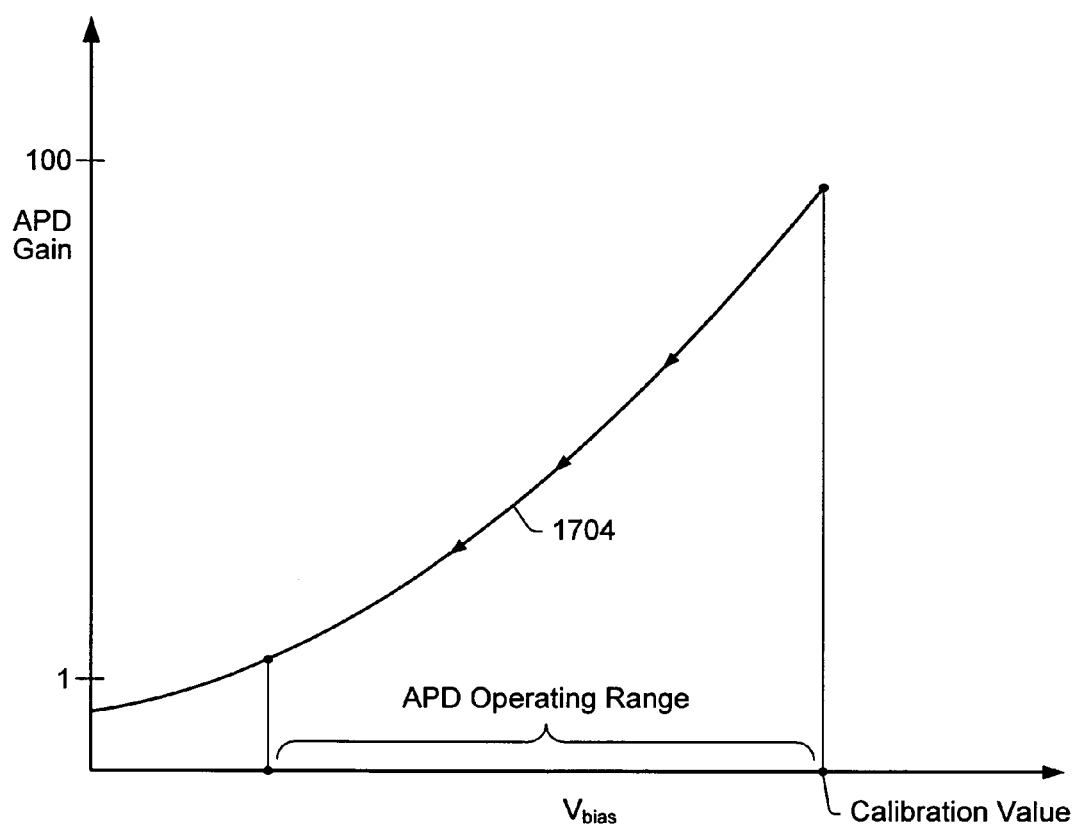
FIG. 14 is a graph of APD gain versus APD voltage bias.

FIG. 14 is a graph of APD gain versus APD voltage bias, showing how the current sense and HVC modules reduce both the APD gain and the APD voltage bias in response to an increasing photo current whereby the APD's operational dynamic range is increased. Along the x-axis is a measure of the voltage bias of the APD over the APD's operating range. Along the y-axis is a measure of the gain of the APD over the APD's operating range. Curve 1704 illustrates that when the photo current into the APD increases, the voltage bias of the APD also decreases. At the same time, the gain of the APD also decreases. This allows the APD to operate over a wider dynamic range.

Figure 15:
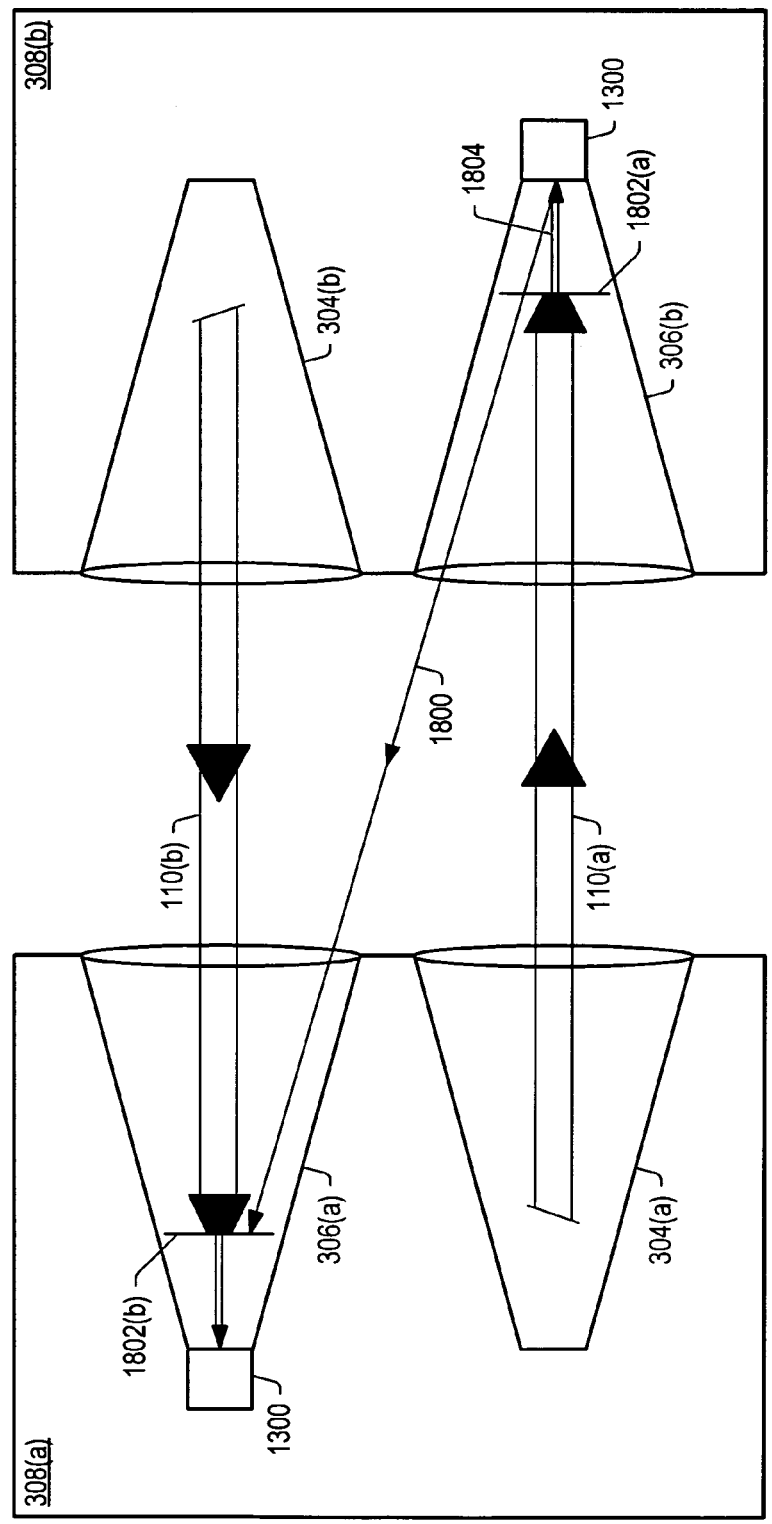
FIG. 15 is a block diagram of transceivers 308(*a*), 308(*b*) from FIG. 3, showing a reflected signal from receiver 306(*b*) interfering with communication beam 110(*b*) at receiver 306(*a*).

FIG. 15 is a block diagram of the transceivers 308(a), 308(b) from FIG. 3, showing a reflected signal 1800 from receiver 306(b) interfering with communication beam 110 (b) at receiver 306(a). When optimal weather conditions occur between transceiver 308(a) and transceiver 308(b), transmitter 304(a) can oversaturate receiver 306(b). Laser power drift by transceiver 304(a) can also lead to saturation of receiver 306(b). Due to the limited dynamic range of the transmitter 304(a), its control module may be unable to reduce the transmitter's power to prevent oversaturation. Additionally, some of the incident light from communication beam 110(a) creates a reflected signal 1800. The reflected signal 1800 is then reflected by the receiver 306(b) in a direction towards the transceiver 308(a). Receiver 306(b), which is associated with transceiver 308(a), may experience interference with its incoming communication beam 110(b) from reflected signal 1800.

To reduce the incident light, an attenuator 1802(a) is located in the path of communication beam 110(a). The attenuator 1802(a) can be an electrochromatic window that is inserted in front of APD 1300. In one embodiment, the attenuator 1802(a) is a light valve LCD iris. Upon application of a voltage to the attenuator 1802(a), its light transmission properties will change due the electrochromatic window going from a bleached state to a colored state. The amount of light transmitted through the attenuator is lower when the attenuator is in the colored state. In another embodiment, the attenuator is a photogrey type material. The photogrey type material changes its transmission properties upon application of a sufficient incident energy without the application of a voltage.

As illustrated in FIG. 15, the signal strength of communication beam 110(a) is initially reduced at a point 1804 after passing through attenuator 1802(a). The communication beam 110(a) is then reflected off of APD 1300 to form reflected signal 1800. However, reflected signal 1800 is further reduced as it passes back through attenuator 1802(a). In one embodiment, receiver 306(a) further includes attenuator 1802(b). Attenuator 1802(b) further reduces the signal strength of reflected signal 1800 before it interferes with incoming communication beam 110(b).

Returning to FIGS. 9 and 10, an attenuator is shown located between APD 1300 and communication beam 110 (a). The attenuator is in electrical communication with attenuation control 1318. Attenuation control 1318 controls the application of voltage to the attenuator. The attenuation control receives an attenuation signal 1212 from processor 602 via A/D converter 942. As mentioned above, the processor 602 monitors the strength of communication beam 110(a) via Rx power output 1210. Monitoring the strength of the communication beam 110(a) allows the processor 602 to dynamically activate and deactivate the attenuator via attenuation control 1318. Attenuation control 1318 is further in electrical communication with power supply 1310. The above described configuration permits a control module 310 to monitor its own receive power and independently control its own receiver 306 to stay within the receiver's dynamic range.

Figure 16:
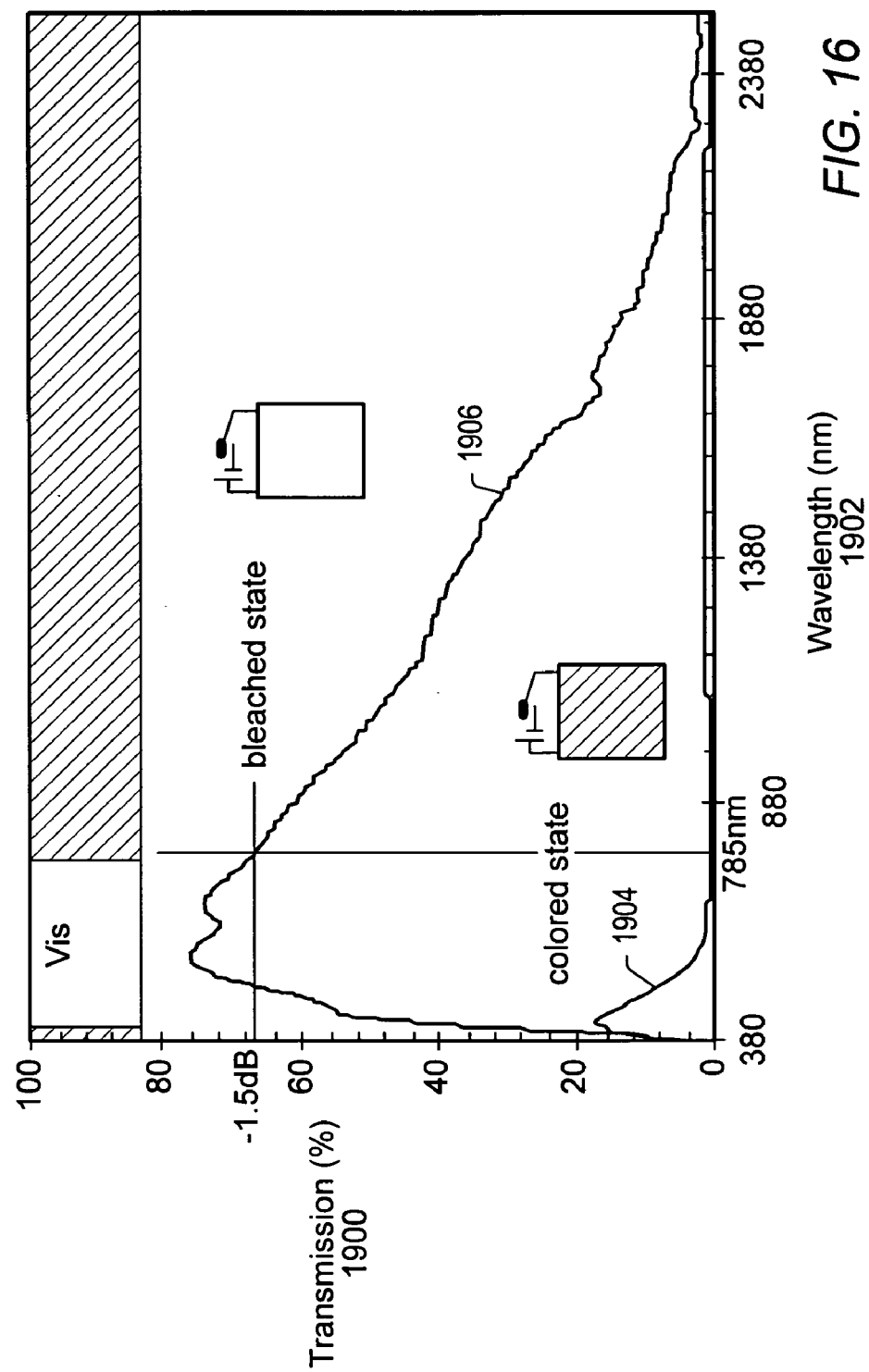
FIG. 16 is a graph showing the transmission percent versus wavelength for the electrochromatic window when the electrochromatic window is activated and when the electrochromatic window is deactivated.

FIG. 16 is a graph showing the transmission percent 1900 versus wavelength 1902 for the electrochromatic window. One line represents when the electrochromatic window is activated and the other line represents when the electrochromatic window is deactivated. The amount of light that passes through the attenuator depends on the wavelength of the communication beam 110(*a*). For example, if the communication beam 110(*a*) is transmitted at a wavelength of 785 nm into the electrochromatic window, the signal strength of the communication beam 110(*a*) is reduced approximately 20 db as shown by line 1904. If the receiver 306(*b*) were near its saturation point for incident light, the 20 db reduction would increase the effective saturation point upon activation of the attenuator 1802. When the attenuator 1802 is deactivated and in its bleached state, some minimum reduction in the signal strength of the communication beam 110(*a*) also occurs. For example, in one embodiment this minimum reduction when the attenuator is in a bleached state is approximately 1.5 dB as shown by line 1906. Under poor weather conditions, the deactivation of the attenuator 1802 increases the energy level of the incident light to the APD 1300. Thus, the attenuator is activated and deactivated to keep the energy level of the incident light within the operational range of the APD 1300. This activation and deactivation can occur in response to, for example, distance between transceivers 308(*a*), 308(*b*) (see FIG. 15), changing weather conditions, and laser power drift.

Figure 17:
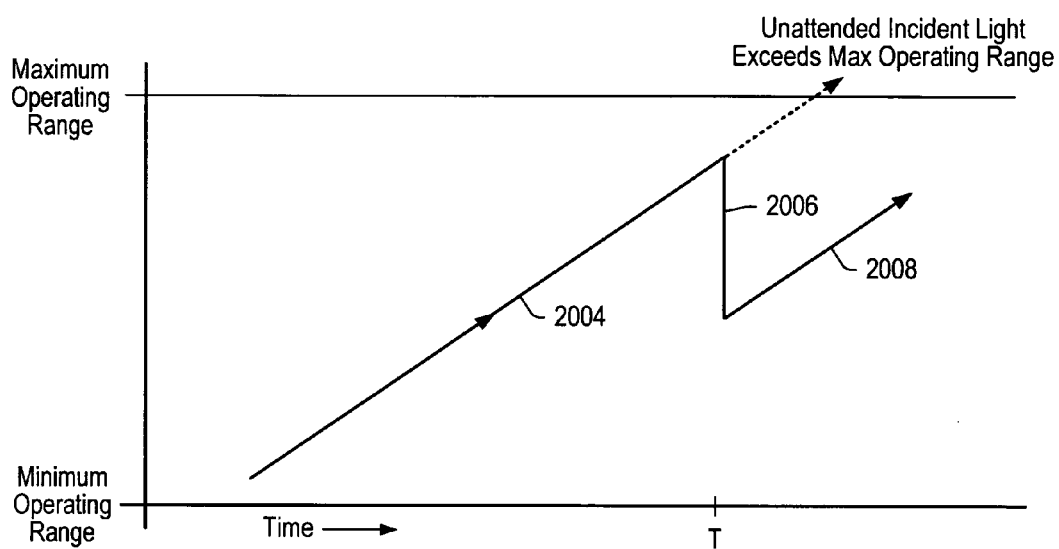
FIG. 17 is a graph of APD operating range versus time, showing the effect of activating the electrochromatic window to reduce the photo current to the APD from a communication beam.

FIG. 17 is a graph of APD operating range versus time, showing the effect of activating the electrochromatic window to reduce the photo current to the APD from a communication beam and thereby increase the APD's operating range. As the photo current increases and nears the maximum operating range (i.e., saturation point) of the APD, the attenuator is activated at a time T. The activation of the attenuator reduces the photo current into the APD and increases the APD's margin to its maximum operating range. As the photo current into the APD continues to increase, represented by line 2008, the APD stays within its operating range.

Figure 18:
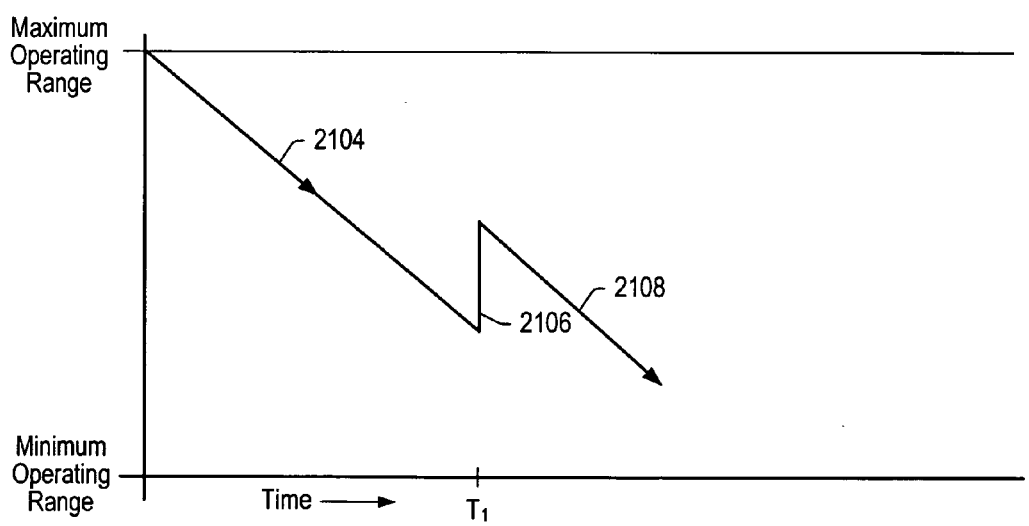
FIG. 18 is a graph of APD operating range versus time, showing the effect of deactivating the electrochromatic window to increase the photo current to the APD from a communication beam.

FIG. 18 is a graph of APD operating range versus time, showing the effect of deactivating the electrochromatic window to increase the photo current to the APD from a communication beam and thereby increase the APD's operating range. As the photo current decreases and nears the minimum operating range of the APD along line 2104, the attenuator is deactivated at a time $T_1$. The deactivation of the attenuator increases the photo current into the APD, represented by line 2106, and increases the APD's margin to its minimum operating range. As the photo current into the APD continues to decrease, represented by line 2108, the APD stays within its operating range.

Figure 19:
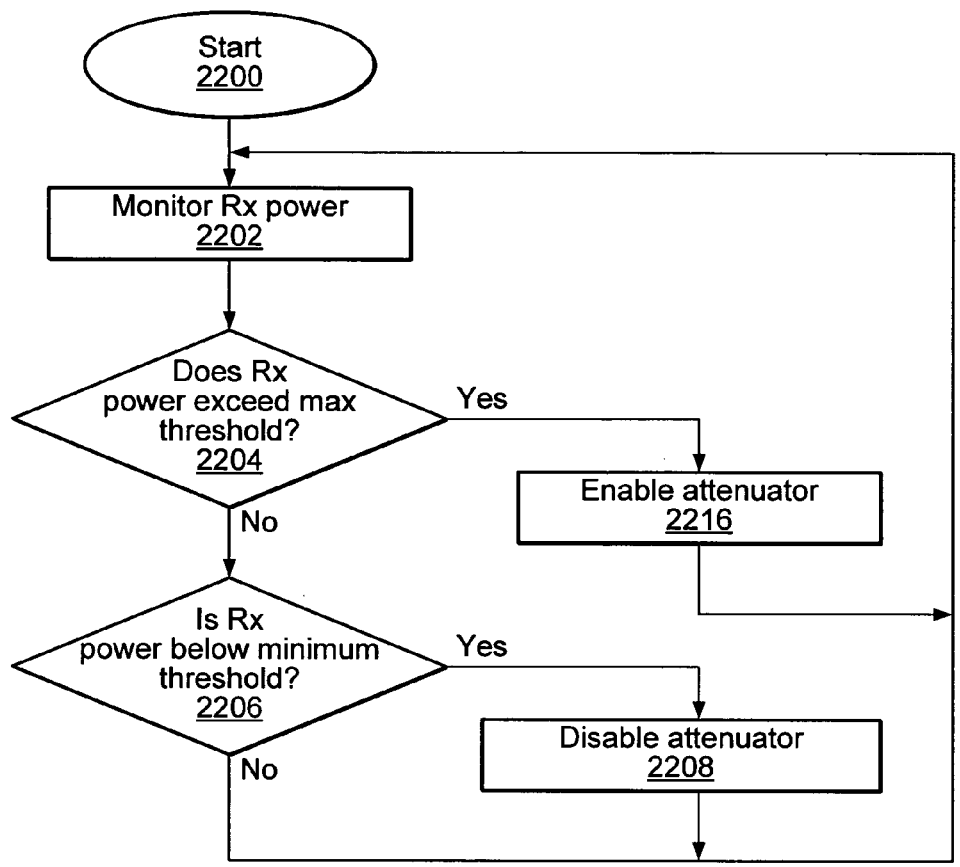
FIG. 19 is a flow chart illustrating an attenuation process for adjusting the power of the incoming communication beam into the APD that is performed by the control module.

FIG. 19 is a flow chart illustrating an attenuation process for adjusting the power of the incoming communication beam into the APD that is performed by the control module. The attenuation process begins at a start state 2200. Next, at a state 2202, processor 602 monitors the Rx power output signal 1210 of APD 1300 (see FIG. 9). Flow continues to a decision state 2204 where the processor 602 determines if the Rx power output exceeds the saturation threshold level of the APD 1300. If the Rx power output does not exceed the saturation threshold level of the APD 1300, the process moves to a decision state 2206 where the processor 602 determines if the Rx output power is below the minimum operating threshold level of the APD 1300. If the Rx power output level is above the minimum operating threshold of the APD 1300, the process returns to state 2202 as described above where the processor 602 monitors the laser Rx power and proceeds as described above.

Returning to decision state 2204, if the processor 602 determines that the Rx power output exceeds the maximum operating threshold level of the APD 1300, the processes continues to a state 2216 where the attenuator is enabled. Flow returns to state 2202 where processor 602 continues to monitor the laser Rx power output as described above.

Returning to decision state 2206, if the processor 602 determines that the Rx power output is below the minimum operating threshold level of the APD 1300, the processes continues to a state 2208 where the attenuator is disabled. Flow returns to state 2202 where the processor 602 continues to monitor the laser Rx power output as described above.

Figure 20:
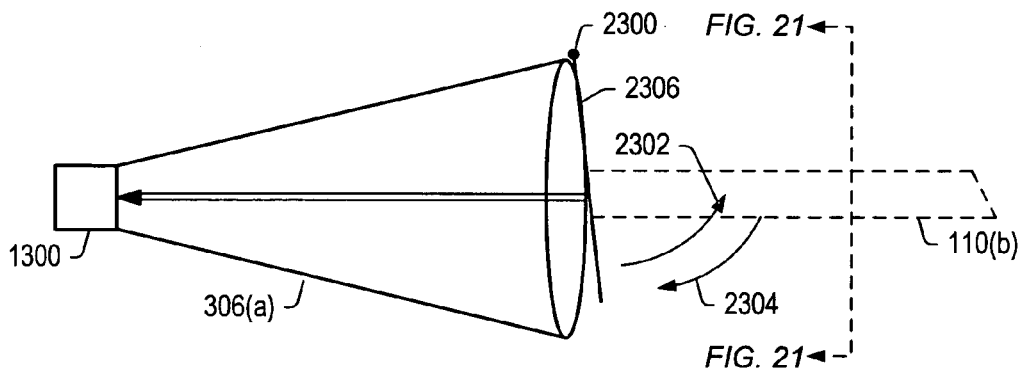
FIG. 20 is a block diagram of a receiver from FIG. 3 configured to allow an attenuating window to be removed from the path of a communication beam.

FIG. 20 is a block diagram of a receiver 306(*a*) from FIG. 3 which includes an electrochromatic window attenuator 2306 configured to be removed from the path of communication beam 110(*b*). Attenuator 2306 is similar to attenuator 1802(*a*) (see FIG. 15) except for being rotatively coupled to the receiver 306(*a*) by pin 2300. Rotation of attenuator 2306 along direction 2302 moves the attenuator out of the path of communication beam 110(*b*). Rotation of attenuator 2306 along direction 2304 moves the attenuator into the path of communication beam 110(*b*). Once rotated into the path of the communication beam 110(*b*), the attenuator 2306 is activated and/or deactivated as described above with reference to FIG. 19. Attenuation control 1318 (see FIG. 10) is further configured to control the rotation of the attenuator 2306 as prescribed by processor 602. Alternative positioning methods for moving the attenuator 2306 into and out of the path of the communication beam 110(*b*) are within the scope of the disclosure.

FIG. 21(*a*) is a plan view of the attenuator window from FIG. 20, further configured to incrementally attenuate a communication beam 110(*b*). Attenuator 2400 is similar to attenuator 2306 (see FIG. 20) except that the window includes a plurality of sectors 2402(*a*)–(*p*). Each sector is configured for independent control by attenuation control 1318 (see FIG. 10). For example, upon activation of sector 2402(*a*) by attenuation control 1318, sector 2402(*a*) transitions from a bleached state to a colored state. This activation reduces the photo current to the APD by an incremental amount as compared to activating the entire attenuating window 2400. Activation of sector 2402(*b*) in addition to already activated sector 2402(*a*) would further attenuate communication beam 110(*b*). Conversely, deactivation of sector 2402(*b*) would increase the photo current to the APD. In an alternate embodiment, groups of sectors are independently controlled by attenuation control 1318. For example, sectors 2402(*a*), 2402(*b*) are simultaneously activated or deactivated by attenuation control 1318. In another embodiment, single sectors 2402 are independently activated to reduce the photo current to the APD while groups of sectors 2402 are deactivated to increase the photo current to the APD. In still another embodiment, single sectors 2402 are independently deactivated to increase the photo current to the APD while groups of sectors 2402 are activated to decrease the photo current to the APD. An embodiment with entirely opaque, as with an LCD, segments is within the scope of the disclosure.

As shown in FIG. 21(*b*), non-adjacent sectors 2402(*b*), 2402(*d*), 2402(*e*), 2402(*g*), 2402(*j*), 2402(*l*), 2402(*m*), 2402(*o*) are in a colored state. In one embodiment, adjacent sectors are activated by attenuation control 1318. The attenuation level for each incremental activation or deactivation of a sector is determined from a ratio of the surface area corresponding to the colored sectors to the area of the entire electrochromatic window. For example, the attenuation level of an incoming communication beam for the attenuating window configuration shown in FIG. 21(*b*) is 50% of the maximum attenuation level.

FIG. 21(*c*) is a plan view of the attenuating window from FIG. 20, further configured to incrementally attenuate a communication beam 110(*b*). Attenuator 2401 is similar to attenuator 2306 (see FIG. 20) except that the attenuating window includes a plurality of concentric circles 2404(*a*)–(*n*). Each area between adjacent circles is configured for independent control by attenuation control 1318 (see FIG. 10). For example, upon activation of an area between circle 2404(*a*) and the perimeter of the attenuating window by attenuation control 1318, the area transitions from a bleached state to a colored state. This activation reduces the photo current to the APD by an incremental amount as compared to activating the entire attenuating window. Activation of the area between circle 2404(*b*) and circle 2404(*a*) in addition to the already activated area between circle 2404(*a*) and the perimeter of the attenuating window would further attenuate communication beam 110(*b*). Deactivation of the area between circle 2404(*a*) and circle 2404(*b*) would increase the photo current to the APD. In an alternate embodiment, groups of areas are independently controlled by attenuation control 1318. For example, the area between circles 2404(*b*) and the perimeter of the attenuating window is simultaneously activated or deactivated by attenuation control 1318. In another embodiment, each area between adjacent circles 2404(*a*)–(*n*) are independently activated to reduce the photo current to the APD while groups of areas are deactivated to increase the photo current to the APD. In still another embodiment, each area between adjacent circles is independently deactivated to increase the photo current to the APD while groups of areas are activated to decrease the photo current to the APD.

As shown in FIG. 21(*d*), the area formed by circles 2404(*a*) and 2404(*b*) along with a non-adjacent area formed by circle 2404(*c*) are both in a colored state. The adjacent areas are activated by attenuation control 1318. The attenuation level for each incremental activation or deactivation of an area(s) is determined from a ratio of the surface area corresponding to the colored area to the area of the entire attenuating window.

Figure 22:
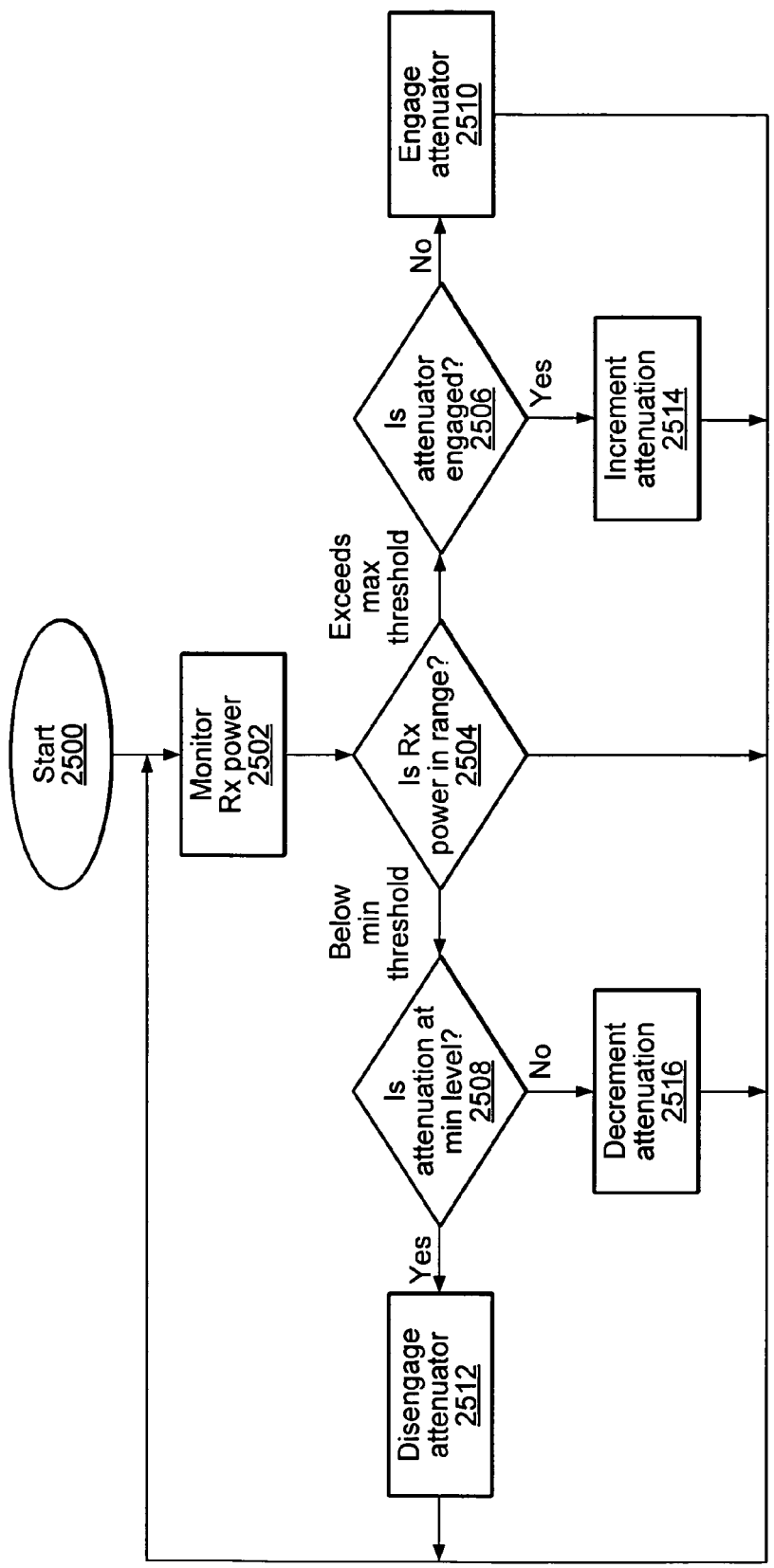
FIG. 22 is a flow chart illustrating an incremental attenuation process for adjusting the power of the incoming communication beam into the APD that is performed by the control module, and includes removing the attenuating window from the path of the communication beam.

FIG. 22 is a flow chart illustrating an incremental attenuation process for adjusting the power of the incoming communication beam into the APD 1300 that is performed by the control module. The process shown includes the engagement/disengagement capability for the attenuator but does not preclude the possibility of an embodiment for incremental attenuation without the engagement/disengagement capability. The attenuation process begins at a start state 2500. Next, at a state 2502, processor 602 monitors the Rx power output signal 1210 of APD 1300. Flow continues to a decision state 2504 to determine if Rx power output is within the minimum and maximum threshold bounds. If the power is within the range the process continues to monitor the Rx power output as described above.

Returning to decision state 2504, if the Rx power output level exceeds the maximum threshold level then the process continues to decision state 2506 where the engagement of the attenuator is checked. If the attenuator is not engaged, i.e., in position, then the process continues to state 2510 at which point the attenuator is engaged. The process continues to monitor the Rx power output as described above.

Returning to decision state 2506, if the attenuator is engaged then the process continues to state 2514 where the attenuation is incremented. The process continues to monitor the Rx power output as described above.

Returning to decision state 2504, if the Rx power level is below the minimum threshold level then the process continues to decision state 2508 where the current attenuation level is checked. If the attenuator is at the minimum then the process continues to state 2512 at which point the attenuator is disengaged. The process continues to monitor the Rx power output as described above.

Returning to decision state 2508, if the attenuation level is not at the minimum level then the process continues to state 2516 where the attenuation is decremented. The process continues to monitor the Rx power output as described above.

Figure 23:
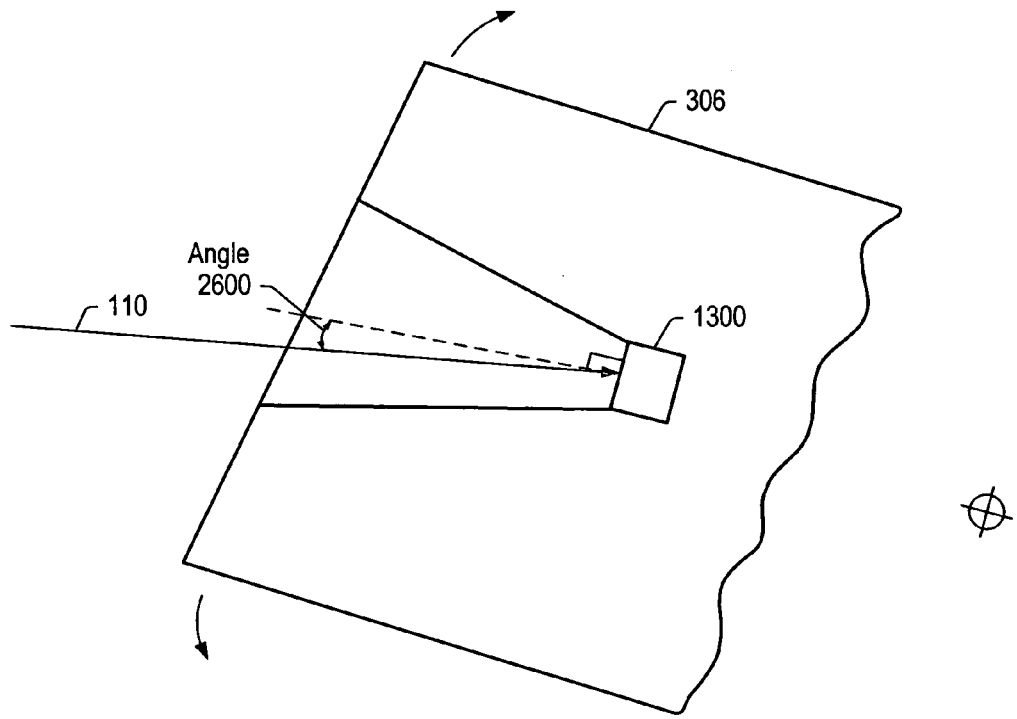
FIG. 23 is a block diagram of a receiver from FIG. 9 showing a misaligned, incoming, communication beam into the APD.

FIG. 23 is a block diagram of a receiver from FIG. 9 showing a misaligned, incoming, communication beam 110 into an APD 1300. Communication beam 110 is misaligned an amount equal to angle 2600. In one embodiment of optical transceivers 308(*a*), 308(*b*) (see FIG. 3), each pair of an optical transmitter and an optical detector is mounted to a motorized turret and is fixed relative to each other. Hence, both the direction of the optical transmitter and the direction of the optical detector change in the same manner with the movement of the turret. An acquisition process in which two suitable turrets respectively located in two different nodes are pointed to each other and are aligned establishes the communication link between the nodes. After the two-way communication is established, information can be transferred between the two nodes. To perform the alignment process, receiver 306 (see FIGS. 10 and 23) is configured to generate two separate signals to represent the power of a received communication beam 110 from another node. The first signal is a receive (Rx) power output signal 1210 of the APD, which can represent the full input power of the received communication beam. However, the Rx power output signal 1210 has low signal sensitivity when the input power to the APD is low. The second signal is a received signal strength indicator (RSSI) 924 (see FIG. 10) which can be saturated at a relatively low power but can be used to measure the input power at low power levels.

Figure 24:
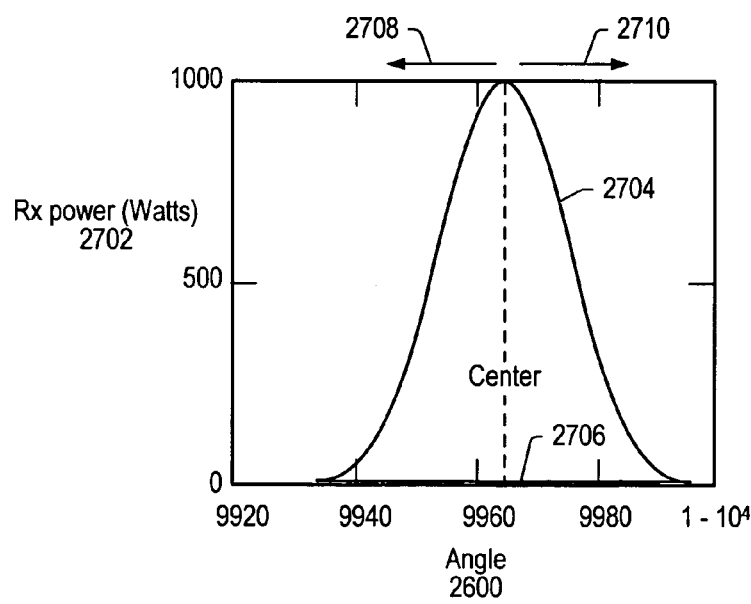
FIG. 24 is a graph of Rx power output versus incident angle for an incoming communication beam showing low sensitivity of the Rx power output signal occurring at lower power levels.

FIG. 24 is a graph of Rx power output 2702 versus incident angle 2600 for an incoming communication beam showing low sensitivity of the Rx power output signal occurring at lower power levels. Line 2704 shows the sensitivity of the Rx power output at high power levels. At these high power levels, processor 602 is able to align APD 1300 to the incoming communication beam by measuring the change in the Rx power output. The processor rotates and/or elevates the receiver via actuators (not shown) while it measures the Rx power output. The receiver 306 is properly aligned with the communication beam 110 when the measured Rx power output is at its maximum value for any given incoming power level. For example, as the receiver rotates in directions 2708, 2710, the Rx power level measured by processor 602 will increase or decreases. If the Rx power level decreases, the receiver stops the rotation in that direction and begins rotating in the opposite direction. This continues until rotation in either direction 2708, 2710 results in a reduction in the Rx power output level measured by the processor. Once this occurs, the receiver is properly aligned. However, at low power levels, Rx power output sensitivity to changes in the incident angle is low. As shown by line 2706, when the sensitivity is low, the processor 602 is unable to properly align the receiver with the communication beam 110.

Figure 25:
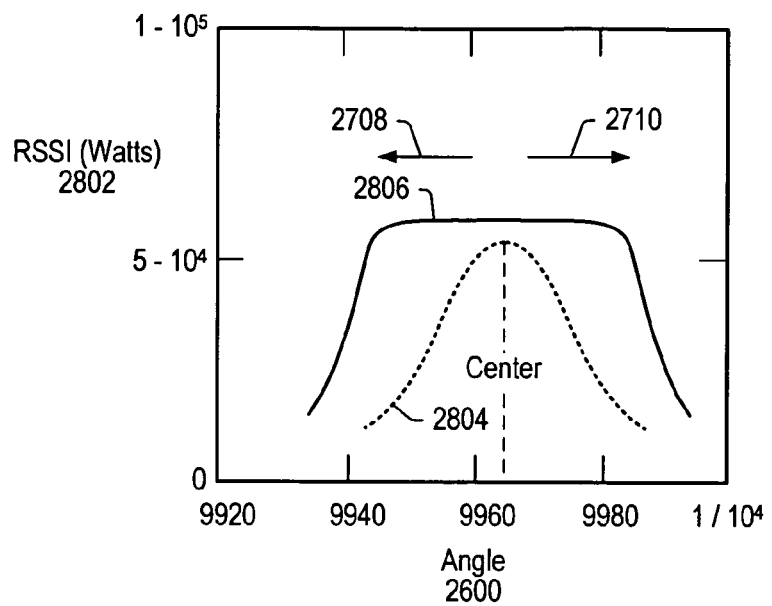
FIG. 25 is a graph of receive signal strength indicator (RSSI) versus incident angle for an incoming communication beam showing clipping of the RSSI occurring at higher power levels.

FIG. 25 is a graph of receive signal strength indicator (RSSI) 2802 versus incident angle 2600 for an incoming communication beam 110 showing clipping of the RSSI occurring at higher power levels. Line 2804 shows the sensitivity of the RSSI at low power levels. At these low power levels, processor 602 is able to align APD 1300 to the incoming communication beam by measuring the change in the RSSI. The processor rotates the receiver via actuators (not shown) while it measures the RSSI. The receiver 306 is properly aligned with the communication beam 110 when the measured RSSI is at its maximum value for any given incoming power level. For example, as the receiver rotates in directions 2708, 2710, the RSSI measured by processor 602 will increase or decreases. If the RSSI decreases, the receiver stops the rotation in that direction and begins rotating in the opposite direction. This continues until rotation in either direction 2708, 2710 results in a reduction in the RSSI measured by the processor. Once this occurs, the receiver is properly aligned. However, at high power levels, RSSI sensitivity to changes in the incident angle is low. As shown by line 2806, when the sensitivity is low, the processor 602 is unable to properly align the receiver with the communication beam 110.

Figure 26:
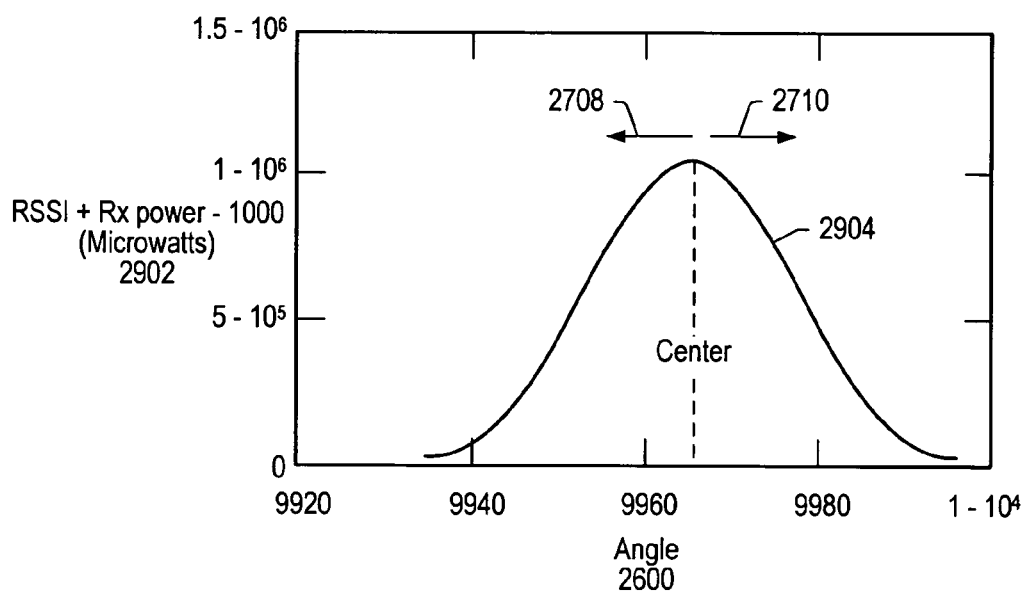
FIG. 26 is a graph of the RSSI and the Rx power output signal combined for use with aligning an incoming communication beam into the APD irrespective of power level.

FIG. 26 is a graph of the RSSI and the Rx power output signal combined 2902 versus incident angle 2600 for use with aligning an incoming communication beam 110 into the APD irrespective of power level. Power level of the received beam may vary due to any single or combination of factors including, but not limited to, atmosphere attenuation, link distance resulting in geometric beam spread, and output laser power. The combined signal is used to indicate the received power level of the APD at both low and high power levels. For example, as the receiver rotates in directions 2708, 2710, the combined signal measured by processor 602 will increase or decreases. If the combined signal decreases, the receiver stops the rotation in that direction and begins rotating in the opposite direction. This continues until rotation in either direction 2708, 2710 results in a reduction in the combined signal level measured by the processor. Once this occurs, the receiver is properly aligned.

Equations for deriving the combined signal based on Rx power output and RSSI are shown below. Equation $P_{RSSI}(x)$ is the scaled curve-fit of the RSSI signal at low and high power.

$$P_{RSSI}(x) := \left| 60000 \text{ if } \left[ 118000 \cdot \exp\left[\frac{-(x-9964)^2}{2 \cdot 16^2}\right] \right] 60000 \right.$$
$$\left| 118000 \cdot \exp\left[\frac{-(x-9964)^2}{2 \cdot 16^2}\right] \text{ otherwise} \right.$$

$x = 9920 \ldots 10000$ $P_{RSSI}(9980) = 6 \cdot 10^4$

Equation $P_{Rx}(x)$ is the scaled curve-fit of the Rx power signal at low and high power.

$$P_{Rx}(x) = 1000 \cdot \exp\left[\frac{-(x-9965)^2}{2 \cdot 10^2}\right]$$

Equation $P_{combined}(x)$ is the scaled sum of equation $P_{RSSI}(x)$ and equation $P_{Rx}(x)$.

$$P_{combined}(x) = 1024 \cdot P_{Rx}(x) + P_{RSSI}(x)$$

These equations are derived empirically from the characterization of the response of the RSSI and Rx power circuitry. Each is a fitted Guassian representing the communication beam profile with appropriate derived scaling factors to yield a composite signal. This composite signal is thus valid over a large range of power.

While the above detailed description has shown, described, and pointed out novel features as applied to various embodiments, it will be understood that various omissions, substitutions, and changes in the form and details of the device or process illustrated may be made by those skilled in the art without departing from the spirit. The scope is indicated by the appended claims rather than by the foregoing description. All changes which come within the meaning and range of equivalency of the claims are to be embraced within their scope.

What is claimed is:

1. A system for controlling laser power in a communication system, the system comprising:
   a first node having a movable avalanche photodiode detector (APD) configured to convert an incoming communication beam in a photo current;
   an amplifier configured to convert the photo current into a voltage signal;
   a processing circuit configured to convert the voltage signal into a received signal strength indicator (RSSI);
   a current sense module configured to measure a receive (Rx) power signal for the movable APD;
   an actuator coupled to the first node and configured to move the APD;
   an optical attenuator coupled to the first node and configured to attenuate an energy level of the incoming communication beam;
   a processor configured to control the alignment of the movable APD with the incoming communication beam based on the RSSI and the Rx power signal and further configured to enable and disable the optical attenuator.

2. The system of claim 1 further comprising:
   a high voltage control (HVC) configured to adjust a variable voltage bias to the APD in response to a change in the photo current whereby an APD gain value is simultaneously adjusted, wherein the variable voltage bias is controlled by the processor using a high voltage control signal based on the Rx power signal measured by the current sense module; and
   a high voltage supply configured to provide voltage to the HVC.

3. The system of claim 1 further comprising:
   a second node configured to transmit the incoming communication beam at a first power level to the first node and configured to receive an outgoing communication beam transmitted by the first node;
   a first control module configured to control the first node to maintain a safe exposure level to a blocking object by changing a second power level of the outgoing communication beam based on the first power level of the incoming communication beam; and
   a second control module configured to maintain the safe exposure to the blocking object by changing the first power level of the incoming communication beam based on the second power level of the outgoing communication beam.

4. A system for calibrating an avalanche photodiode detector (APD) for use in an optical communication system, the system comprising:
- a current sense module configured to measure a receive (Rx) power output value for an APD;
- a high voltage control (HVC) configured to provide a variable voltage bias to the APD in accordance with a high voltage control signal;
- a thermal sensor configured to measure a temperature of the APD;
- a processor configured to provide the high voltage control signal to the HVC, wherein the high voltage control signal is based on the temperature and the Rx power output value; and
- a high voltage supply configured to provide voltage to the HVC;
- wherein the current sense module includes a first series resistor located between the APD and the HVC and configured to measure a conduction value for the APD, and wherein the current sense module further includes a first differential amplifier configured to amplify the measured conduction value and provide the Rx power output value to the processor;
- wherein the HVC includes a second series resistor and an electrical feedback loop, wherein the electrical feedback loop is configured to change the variable voltage bias to the APD in response to the high voltage control signal.

5. The system of claim 4, wherein the electrical feedback loop includes a differential amplifier and a field effect transistor.

6. A system for increasing an operational dynamic range of an avalanche photodiode detector (APD) for use in an optical communication system, the system comprising:
- a current sense module configured to measure an incoming photo current to an APD;
- a high voltage control (HVC) configured to reduce a variable voltage bias to the APD in response to a decrease in the incoming photo current whereby an APD gain value is simultaneously decreased;
- a processor configured to control the variable voltage bias using a high voltage control signal based on the incoming photo current measured by the current sense module; and
- a high voltage supply configured to provide voltage to the HVC;
- wherein the current sense module includes a first series resistor located between the APD and the HVC;
- wherein the HVC includes a second series resistor and an electrical feedback loop, wherein the electrical feedback loop is configured to change the variable voltage bias to the APD in response to the high voltage control signal.

7. The system of claim 6, wherein the electrical feedback loop includes a differential amplifier and a field effect transistor.

8. A method for calibrating an avalanche photodiode detector (APD) for use in an optical communication system, the method comprising:
- turning off transmitted optical power incident on the APD to limit light from reaching the APD;
- lowering a bias voltage for the APD to zero volts;
- once lowered, measuring an initial conduction for the APD;
- storing the initial conduction;
- incrementally increasing the bias voltage until current is sensed through the APD;
- once current is sensed, measuring a maximum bias voltage across the APD;
- determining a calibration value based on the initial conduction and the maximum bias voltage; and
- applying the calibration value to the APD.

9. The method of claim 8, further comprising: measuring a temperature of the APD; and correcting the calibration value based on the measured temperature.

10. The method of claim 8, wherein the maximum bias voltage is reduced by a predetermined amount.

11. A method for controlling incoming laser power in a communication system which includes a first node and a second node, where the second node is configured to transmit a first communication beam to the first node, and where the first node includes a first optical attenuator, the method comprising:
- monitoring the receive (Rx) power level of a photodiode detector in a first node;
- determining if the Rx power level exceeds a saturation threshold level for the photodiode detector;
- if the Rx power level exceeds the saturation threshold level of the photodiode detector, enabling a first optical attenuator that is located in a path between a first communication beam and the photodiode detector; and
- if the Rx power level is below a minimum threshold level of the photodiode detector, disabling the first optical attenuator;
- wherein the first optical attenuator is configured to move into and out of the path of the first communication beam.

12. The method of claim 11, wherein the first optical attenuator is configured to control the energy of the first communication beam as it passes through the first optical attenuator.

13. The method of claim 11, wherein the first optical attenuator is configured as an electrochromatic window which changes its light transmission properties upon application of a voltage.

14. The method of claim 11, further comprising enabling a second optical attenuator that is located in the path between a second communication beam and the second node, wherein the second communication beam is a reflected signal from the first communication beam.

15. A method for controlling incoming laser power in a communication system which includes a first node and a second node, where the second node is configured to transmit a first communication beam to the first node, and where the first node includes a first optical attenuator, the method comprising:
- monitoring the receive (Rx) power level of a photodiode detector in a first node;
- determining if the Rx power level exceeds a saturation threshold level for the photodiode detector;
- if the Rx power level exceeds the saturation threshold level of the photodiode detector, enabling a first optical attenuator that is located in a path between a first communication beam and the photodiode detector; and
- if the Rx power level is below a minimum threshold level of the photodiode detector, disabling the first optical attenuator;
- wherein the first optical attenuator is configured as a light valve LCD iris.

16. A method for controlling incoming laser power in a communication system which includes a first node and a second node, where the second node is configured to transmit a first communication beam to the first node, and where the first node includes a first optical attenuator, the method comprising:

monitoring the receive (Rx) power level of a photodiode detector in a first node;

determining if the Rx power level exceeds a saturation threshold level for the photodiode detector;

if the Rx power level exceeds the saturation threshold level of the photodiode detector, enabling a first optical attenuator that is located in a path between a first communication beam and the photodiode detector; and if the Rx power level is below a minimum threshold level of the photodiode detector, disabling the first optical attenuator;

wherein the first optical attenuator is a photogrey type material which is configured to change its light transmission properties upon application of a sufficient amount of incident energy from the first communication beam.

17. A system configured for controlling incoming laser power in a communication system which includes a first node and a second node, where the second node is configured to transmit a communication beam to the first node, the system comprising:

a first node having a photodiode detector configured to receive an incoming communication beam;

a first optical attenuator coupled to the first node and configured to attenuate the incoming communication beam prior to it reaching the photodiode detector;

a second node configured to transmit the incoming communication beam; and a first attenuation control module configured to control the first optical attenuator to maintain a power level of the incoming communication beam to within an operational range of the photodiode detector;

wherein the first attenuation control is configured to disable and enable the first optical attenuator to keep the power level of the incoming communication beam to within the operational range of the photodiode detector;

wherein the first attenuation control is further configured to move the first optical attenuator into and out of a path of the incoming communication beam.

18. The system of claim 17, further comprising a second optical attenuator that is located between an outgoing communication beam and the first node, wherein the outgoing communication beam is a reflected signal from the incoming communication beam.

19. A system configured for controlling incoming laser power in a communication system which includes a first node and a second node, where the second node is configured to transmit a communication beam to the first node, the system comprising:

a first node having a photodiode detector configured to receive an incoming communication beam;

a first optical attenuator coupled to the first node and configured to attenuate the incoming communication beam prior to it reaching the photodiode detector;

a second node configured to transmit the incoming communication beam; and a first attenuation control module configured to control the first optical attenuator to maintain a power level of the incoming communication beam to within an operational range of the photodiode detector;

wherein the first attenuation control is configured to disable and enable the first optical attenuator to keep the power level of the incoming communication beam to within the operational range of the photodiode detector;

wherein the first optical attenuator is configured as an electrochromatic window which changes its light transmission properties upon application of a voltage by the attenuation control.

20. A system configured for controlling incoming laser power in a communication system which includes a first node and a second node, where the second node is configured to transmit a communication beam to the first node, the system comprising:

a first node having a photodiode detector configured to receive an incoming communication beam;

a first optical attenuator coupled to the first node and configured to attenuate the incoming communication beam prior to it reaching the photodiode detector;

a second node configured to transmit the incoming communication beam; and a first attenuation control module configured to control the first optical attenuator to maintain a power level of the incoming communication beam to within an operational range of the photodiode detector;

wherein the first attenuation control is configured to disable and enable the first optical attenuator to keep the power level of the incoming communication beam to within the operational range of the photodiode detector;

wherein the first optical attenuator is configured as a light valve LCD iris.

21. A system configured for controlling incoming laser power in a communication system which includes a first node and a second node, where the second node is configured to transmit a communication beam to the first node, the system comprising:

a first node having a photodiode detector configured to receive an incoming communication beam;

a first optical attenuator coupled to the first node and configured to attenuate the incoming communication beam prior to it reaching the photodiode detector;

a second node configured to transmit the incoming communication beam; and a first attenuation control module configured to control the first optical attenuator to maintain a power level of the incoming communication beam to within an operational range of the photodiode detector;

wherein the first attenuation control is configured to disable and enable the first optical attenuator to keep the power level of the incoming communication beam to within the operational range of the photodiode detector;

wherein the first optical attenuator is a photogrey type material which is configured to change its light transmission properties upon application of a sufficient amount of incident energy from the incoming communication beam.

22. A system for aligning an optical receiver to an incoming communication beam for use in an optical communication system, the system comprising:

an avalanche photodiode detector (APD) configured to convert a communication beam into a photo current;

an amplifier configured to convert the photo current into a voltage signal;

a processing circuit configured to convert the voltage signal into a received signal strength indicator (RSSI);

a current sense module configured to measure a receive (Rx) power signal for the APD;

an actuator configured to align the APD with the communication beam; and a processor configured to control the actuator based on a combined power signal which includes the RSSI and the Rx power signal.

23. The system of claim 22, wherein the Rx power signal measures conduction through the APD.

24. The system of claim 22, wherein the processor is further configured to determine the RSSI based on an empirically determined relationship of signal strength to incident angle of the communication beam, and is derived from characterization of behavior of the optical communication system.

25. The system of claim 24, wherein the RSSI signal ($P_{RSSI}(x)$) is calculated from $$P_{RSSI}(x) := \left| \begin{array}{l} 60000 \text{ if } \left[118000 \cdot \exp\left[\frac{-(x-9964)^2}{2 \cdot 16^2}\right] > 60000\right] \\ \left|118000 \cdot \exp\left[\frac{-(x-9964)^2}{2 \cdot 16^2}\right]\right| \text{ otherwise} \end{array} \right.$$

$P_{RSSI}(9980) = 6 \cdot 10^4$, where x is an incident angle in the range from 9920 to 10000.

26. The system of claim 22, wherein the processor is further configured to determine the Rx power signal based on an empirically determined relationship of signal strength to incident angle of the communication beam, and is derived from characterization of the behavior of the optical communication system.

27. The system of claim 26, wherein the Rx power signal ($P_{Rx}(x)$) is calculated from $$P_{Rx}(x) = 1000 \cdot \exp\left[\frac{-(x-9965)^2}{2 \cdot 10^2}\right].$$

28. The system of claim 22, wherein the processor is further configured to determine the combined power signal based on a weighted sum of components including the Rx power signal and the RSSI.

29. The system of claim 28, wherein the combined power signal ($P_{combined}(X)$) is calculated from $P_{combined}(X) = 1024 \cdot P_{Rx}(x) + P_{RSSI}(x)$.

30. The system of claim 29, wherein the processor maximizes the combined power signal.

31. A method for aligning an optical receiver to an incoming communication beam for use in an optical communication system, wherein the optical communication system includes a first node and a second node, each including a movable avalanche photodiode detector (APD) configured to receive a communication beam from the other node, the method comprising:

converting an incoming communication beam to an APD into a photo current;
converting the photo current into a voltage signal;
determining a received signal strength indicator (RSSI) from the voltage signal;
determining a receive (Rx) power signal for the APD;
aligning the APD with the communication beam based on the RSSI and the Rx power signal.

32. The method of claim 31, wherein determining the RSSI includes empirically determining a relationship of signal strength to incident angle of the incoming communication beam that is derived from characterization of behavior of the optical communication system.

33. The method of claim 32, wherein determining the RSSI signal ($P_{RSSI}(x)$) is calculated from $$P_{RSSI}(x) := \left| \begin{array}{l} 60000 \text{ if } \left[118000 \cdot \exp\left[\frac{-(x-9964)^2}{2 \cdot 16^2}\right] > 60000\right] \\ \left|118000 \cdot \exp\left[\frac{-(x-9964)^2}{2 \cdot 16^2}\right]\right| \text{ otherwise} \end{array} \right.$$

$P_{RSSI}(9980) = 6 \cdot 10^4$, where x is an incident angle in the range from 9920 to 10000.

34. The method of claim 31, wherein determining the Rx power signal includes empirically determining a relationship of signal strength to incident angle of the incoming communication beam that is derived from characterization of behavior of the optical communication system.

35. The method of claim 34, wherein determining the Rx power signal ($P_{Rx}(x)$) is calculated from $$P_{Rx}(x) = 1000 \cdot \exp\left[\frac{-(x-9965)^2}{2 \cdot 10^2}\right].$$

36. The method of claim 31, further comprising combining the RSSI and the Rx power signal based on a weighted sum of components that includes the Rx power signal and the RSSI.

37. The method of claim 36, wherein aligning the APD includes maximizing a combined power signal ($P_{combined}(X)$) which includes the RSSI and the Rx power signal using equation $P_{combined}(X) = 1024 \cdot P_{Rx}(x) + P_{RSSI}(x)$.

* * * * *